United States Patent
Asver et al.

(10) Patent No.: US 11,257,050 B2
(45) Date of Patent: Feb. 22, 2022

(54) SYSTEMS AND METHODS FOR CRYPTOCURRENCY ASSET BUNDLES

(71) Applicant: Coinbase, Inc., San Francisco, CA (US)

(72) Inventors: Ajmal Asver, San Francisco, CA (US); Vladimir Milosevic, San Francisco, CA (US); Andrew Flockhart, San Francisco, CA (US); Carly Emmer, San Francisco, CA (US); Amy Yin, San Francisco, CA (US)

(73) Assignee: Coinbase, Inc., San Francisco, CA (US)

( * ) Notice: Subject to any disclaimer, the term of this patent is extended or adjusted under 35 U.S.C. 154(b) by 0 days.

(21) Appl. No.: 16/555,847

(22) Filed: Aug. 29, 2019

(65) Prior Publication Data

US 2020/0074421 A1 Mar. 5, 2020

Related U.S. Application Data

(60) Provisional application No. 62/726,109, filed on Aug. 31, 2018, provisional application No. 62/782,880, filed on Dec. 20, 2018.

(51) Int. Cl.
*G06Q 20/06* (2012.01)

(52) U.S. Cl.
CPC .................. *G06Q 20/065* (2013.01)

(58) Field of Classification Search
None
See application file for complete search history.

(56) References Cited

U.S. PATENT DOCUMENTS

| 9,892,460 | B1 * | 2/2018 | Winklevoss | G06Q 40/04 |
| 2019/0303888 | A1 * | 10/2019 | Hamasni | G06Q 20/0655 |
| 2020/0027067 | A1 * | 1/2020 | Hertzog | H04L 9/3239 |

OTHER PUBLICATIONS

"TokenSets", https:web.archive.org/web/20180815234324/https://www.tokensets.com/, Aug. 21, 2019, 3 pages.
Mayer, Rachel, "Buy the crypto market in a few taps", https://blog.circle/2018/05/22/buy-the-market/, May 22, 2018, 3 pages.

* cited by examiner

*Primary Examiner* — Namrata Boveja
*Assistant Examiner* — Amit Patel
(74) *Attorney, Agent, or Firm* — Banner & Witcoff, Ltd.

(57) ABSTRACT

Systems and methods for managing bundles of cryptocurrency assets.

20 Claims, 19 Drawing Sheets

← 400

Get all 5 currencies with the Coinbase Bundle

The Coinbase Bundle is a convenient way to buy all 5 of the cryptocurrencies on Coinbase in a single purchase View Bundle

| Your Portfolio | | Recent Activity |
|---|---|---|
| Bitcoin | 0.0 BTC | |
| Bitcoin Cash | 0.0 BCH | No buys or sells yet |
| Etherium | 0.0 ETH | You've successfully linked a payment method and can start buying using digital currency. |
| Litecoin | 0.0 LTC | |
| Ethereum Classic | 0.0 ETC | |
| US Dollars | $0.0 | Buy now |
| Total Balance = $0 | | |

FIGURE 4A

| Get all 5 currencies with the Coinbase Bundle | |
|---|---|
| The Coinbase Bundle is a convenient way to buy all 5 of the cryptocurrencies on Coinbase in a single purchase | |
| Your Portfolio | Recent Activity |
| Bitcoin 0.0084297 BTC | |
| Bitcoin Cash 0.00915283 BCH | Bought Bitcoin |
| Etherium 0.05198747 ETH | Bought Bitcoin Cash |
| Litecoin 0.02469294 LTC | Bought Ethereum |
| Ethereum Classic 0.00376843 ETC | Bought Litecoin |
| US Dollars $0.0 | Bought Ethereum Classic |
| Total Balance = $96.16 | |

User A :

Asset 1 Bundle Account; Account ID 1.001;
   Asset 2 Bundle Account; Account ID 2.001;
   Asset 3 Bundle Account; Account ID 3.001;
   Asset 4 Bundle Account; Account ID 4.001;

User B:

Asset 1 Bundle Account; Account ID 1.002;
   Asset 2 Bundle Account; Account ID 2.002;
   Asset 3 Bundle Account; Account ID 3.002;
   Asset 4 Bundle Account; Account ID 4.002;

User C:

Asset 1 Bundle Account; Account ID 1.003;
   Asset 2 Bundle Account; Account ID 2.003;
   Asset 3 Bundle Account; Account ID 3.003;
   Asset 4 Bundle Account; Account ID 4.003;
   Asset 5 Bundle Account; Account ID 5.003;
   Asset 6 Bundle Account; Account ID 6.003;
   Asset 7 Bundle Account; Account ID 7.003;
   Asset 8 Bundle Account; Account ID 8.003;

```
Bundle 1 Definition: (Author: System)

Asset 1
  Asset 2
  Asset 3
  Asset 4

Bundle 2 Definition: (Author: System)

Asset 1
  Asset 2
  Asset 5
  Asset 6
  Asset 7

Bundle 3 Definition: (Author: User C)

Asset 1
  Asset 5
  Asset 6
  Asset 7
  Asset 8
```

```
User A :

Asset Bundle 1: Bundle 1; Bundle ID =  1.001

User B:

Asset Bundle 1: Bundle 1; Bundle ID = 1.002

User C:

Asset Bundle 1: Bundle 1; Bundle ID = 1.003
    Asset Bundle 2: Bundle 2; Bundle ID = 2.001
    Asset Bundle 3: Bundle 3; Bundle ID = 3.001
```

*FIGURE 8*

User A Data
← 900A

Asset 1 Bundle Account 1.001

01 Contribution: 0.25 BTC; Bundle ID = 1.001

Asset 2 Bundle Account 2.001

01 Contribution: 0.25 BCH; Bundle ID = 1.001

Asset 3 Bundle Account 3.001

01 Contribution: 0.25 ETH; Bundle ID = 1.001

Asset 4 Bundle Account 4.001

01 Contribution: 0.25 LTC; Bundle ID = 1.001

*FIGURE 9A*

User B Data
← 900B

Asset 1 Bundle Account 1.002

01 Contribution: 0.5 BTC; Bundle ID = 1.002

Asset 2 Bundle Account 2.002

01 Contribution: 0.5 BCH; Bundle ID = 1.002

Asset 3 Bundle Account 3.002

01 Contribution: 0.5 ETH; Bundle ID = 1.002

Asset 4 Bundle Account 4.002

01 Contribution: 0.5 LTC; Bundle ID = 1.002

*FIGURE 9B*

User C Data
← 900C

Asset 1 Bundle Account 1.003

01 Contribution: 0.5 BTC;  Bundle ID =  1.003
   02 Contribution: 0.5 BTC;  Bundle ID =  2.001
   03 Contribution: 0.5 BTC;  Bundle ID =  3.001

Asset 2 Bundle Account 2.003

01 Contribution: 0.5 BCH;  Bundle ID =  1.003
   02 Contribution: 0.5 BCH;  Bundle ID =  2.001

Asset 3 Bundle Account 3.003

01 Contribution: 0.5 ETH;  Bundle ID =  1.003

Asset 4 Bundle Account 4.003

01 Contribution: 0.5 LTC;  Bundle ID =  1.003

Asset 5 Bundle Account 5.003

01 Contribution: 0.5 XRP;  Bundle ID =  2.001
   02 Contribution: 0.5 XRP;  Bundle ID =  3.001

Asset 6 Bundle Account 6.003

01 Contribution: 0.5 XLM;  Bundle ID =  2.001
   02 Contribution: 0.5 XLM;  Bundle ID =  3.001

Asset 7 Bundle Account 7.003;

01 Contribution: 0.5 EOS;  Bundle ID =  2.001
   02 Contribution: 0.5 EOS;  Bundle ID =  3.001

Asset 8 Bundle Account 8.003;

01 Contribution: 0.5 XTZ;  Bundle ID =  3.001

```
User A :

Asset 1 Bundle Account; Account ID 1.001;
   Asset 2 Bundle Account; Account ID 2.001;
   Asset 3 Bundle Account; Account ID 3.001;
   Asset 4 Bundle Account; Account ID 4.001;

User B:

Asset 1 Bundle Account; Account ID 1.002;
   Asset 2 Bundle Account; Account ID 2.002;
   Asset 3 Bundle Account; Account ID 3.002;
   Asset 4 Bundle Account; Account ID 4.002;

User C:

Asset 1 Bundle Account; Account ID 1.003;
   Asset 2 Bundle Account; Account ID 2.003;
   Asset 3 Bundle Account; Account ID 3.003;
   Asset 4 Bundle Account; Account ID 4.003;
   Asset 5 Bundle Account; Account ID 5.003;
   Asset 6 Bundle Account; Account ID 6.003;
   Asset 7 Bundle Account; Account ID 7.003;
   Asset 8 Bundle Account; Account ID 8.003;
   Asset 8_1 Bundle Account; Account ID 8_1.003;
```

Asset 1 Bundle Account 1.003

01 Contribution: 0.5 BTC; Bundle ID = 1.003
    02 Contribution: 0.5 BTC; Bundle ID = 2.001
    03 Contribution: 0.5 BTC; Bundle ID = 3.001

Asset 2 Bundle Account 2.003

01 Contribution: 0.5 BCH; Bundle ID = 1.003
    02 Contribution: 0.5 BCH; Bundle ID = 2.001

Asset 3 Bundle Account 3.003

01 Contribution: 0.5 ETH; Bundle ID = 1.003

Asset 4 Bundle Account 4.003

01 Contribution: 0.5 LTC; Bundle ID = 1.003

Asset 5 Bundle Account 5.003

01 Contribution: 0.5 XRP; Bundle ID = 2.001
    02 Contribution: 0.5 XRP; Bundle ID = 3.001

Asset 6 Bundle Account 6.003

01 Contribution: 0.5 XLM; Bundle ID = 2.001
    02 Contribution: 0.5 XLM; Bundle ID = 3.001

Asset 7 Bundle Account 7.003;

01 Contribution: 0.5 EOS; Bundle ID = 2.001
    02 Contribution: 0.5 EOS; Bundle ID = 3.001

Asset 8 Bundle Account 8.003;

01 Contribution: 0.5 XTZ; Bundle ID = 3.001

Asset 8_1 Bundle Account 8_1.003;

01 Contribution: 0.1 XTZ_Fork; Bundle ID = 3.001

FIGURE 12

SYSTEMS AND METHODS FOR CRYPTOCURRENCY ASSET BUNDLES

CROSS-REFERENCE TO RELATED APPLICATIONS

This application claims priority to U.S. Provisional Application No. 62/726,109 filed 31 Aug. 2018 and U.S. Provisional Application No. 62/782,880 filed 20 Dec. 2018, which are each incorporated herein in its entirety by this reference.

TECHNICAL FIELD

This invention relates generally to the cryptocurrency field, and more specifically to a new and useful system and method for providing asset bundles in the cryptocurrency field.

BACKGROUND

Cryptocurrency assets are typically purchased by using an exchange that allows a user to purchase a cryptocurrency asset using fiat currency (e.g., dollars). If a user wishes to buy several types of cryptocurrency assets, the typically executes several separate purchase transactions.

Thus, there is a need in the cryptocurrency field to create a new and useful system and method for purchasing cryptocurrency assets. This invention provides such a new and useful system and method.

BRIEF DESCRIPTION OF THE FIGURES

FIGS. 4A-F are schematic representations of a user interface, in accordance with variations.

FIGS. 6-12 are schematic representations of exemplary data stored by an asset bundle management system, in accordance with variations.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

The method includes at least one of: maintaining a cryptocurrency exchange; receiving a purchase order request for an asset bundle; processing a purchase order related to the purchase order request; and updating the asset bundle.

In some variations, updating the asset bundle includes at least one of adding a new asset to the asset bundle and rebalancing the asset bundle. The new asset can be an asset related to an asset in an asset bundle (e.g., a fork or airdrop related to a cryptocurrency asset in the bundle). In some variations, the new asset is added in response to a notification received from an exchange (e.g., implemented by the system 104), the notification identifying the addition of the new asset to the exchange. In some variations, the new asset is added in response to a notification received from an exchange (e.g., implemented by the system 104), and a determination that the new cryptocurrency asset is related to the asset bundle.

In some implementations, for each user owning an instance of the asset bundle, a new bundle account is created for the new asset. In some implementations, a new crypto cryptocurrency wallet is created for the new asset and the new cryptocurrency wallet manages the new bundle account.

In some variations, addition of the new cryptocurrency asset to the asset bundle triggers rebalancing of the asset bundle. In some variations, rebalancing is performed in accordance with rebalancing configuration information (e.g., per-account configuration, account-group configuration, global bundle configuration, etc.). In a first implementation, the new asset is treated as part of the related original asset, and rebalancing is performed as if the amount of the related original asset were increased (e.g., the values of the original asset and the related new asset are combined and treated as a single asset value for purposes of rebalancing). In a second implementation, the new asset is treated as distinct from the related original asset.

The method can optionally include: facilitating transfer of the purchased cryptocurrency assets (of the asset bundle) to the user; or otherwise managing the purchased assets.

Figure 2:
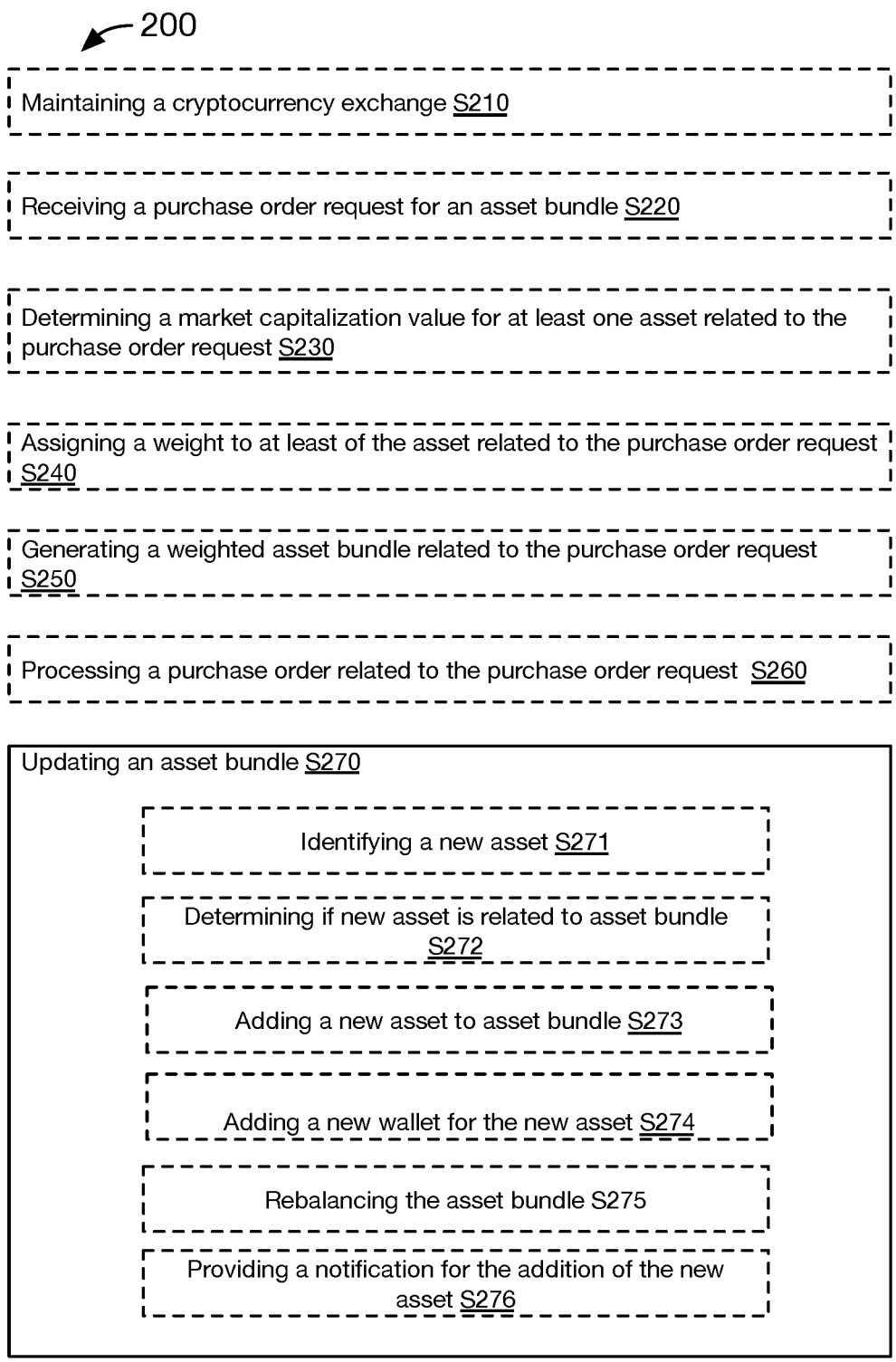
FIG. 2 is a flowchart representation of a method, in accordance with variations.

As shown in FIG. 2, in some variations, the method includes at least one of: maintaining a cryptocurrency exchange (S210); receiving a purchase order request for an asset bundle (S220); determining a market capitalization value for at least one asset related to the purchase order request (S230); assigning a weight to at least one asset related to the purchase order request (S240); generating a weighted asset bundle related to the purchase order request (S250); processing a purchase order related to the purchase order request (S260); and updating an asset bundle related to the purchase order request (S270).

In some variations, S210 includes maintaining a cryptocurrency exchange comprising a plurality of cryptocurrency assets.

In some variations, S220 includes receiving a purchase order request from a user, the purchase order request including a desired order price and a selection of an asset bundle from a predefined list of asset bundles, the asset bundle including a subset of the plurality of cryptocurrency assets. In some variations, the purchase order request is a request for an initial purchase of an asset bundle. In some variations, the purchase order request is a request for a contribution to an existing asset bundle.

In some variations, S230 includes determining a market capitalization value for each asset in the subset of assets.

In some variations, S240 includes assigning distributed weights to each of the assets in the subset of assets based on comparing the market capitalization values of the assets.

In some variations, S250 includes generating a weighted asset bundle, wherein the weighted asset bundle includes the subset of assets with assigned weights.

In some variations, S260 includes processing a purchase order of the weighted asset bundle for the user, wherein each of the assets in the weighted asset bundle are purchased on behalf of the user in quantities according to the desired order price modified by the assigned weight of the asset.

In examples, the asset bundle can include the set of cryptocurrency assets included in the bundle, while the weighted asset bundle can include the weights for each of the constituent cryptocurrency assets. However, the asset bundle and weighted asset bundle can be otherwise defined.

In some variations, the method functions to process purchase order requests received on behalf of users of the exchange (e.g., 104 shown in FIG. 1) to purchase a weighted cryptocurrency asset bundle. In some variations, a user investing in the weighted asset bundle will have direct exposure to the individual assets in the bundle. In some embodiments, the method includes managing the assets as well as controlling custody of the individual assets on behalf of the user.

In one variation, the method includes allowing a user to purchase multiple assets together in a single order of a bundle, with quantities of the assets being distributed within the bundle based on market capitalization values (hereinafter "market cap"). Market cap provides the value of the cryptocurrency asset on the open market, and is calculated by multiplying the current per-share price of the asset by the total number of existing shares. The market cap value can be determined from: the exchange (e.g., 104) (associated with the cryptocurrency asset) hosted by the system, a secondary exchange, estimated based on historic data (e.g., transaction data retrieved from a full node of the respective cryptocurrency network), or otherwise determined. However, the assets within the bundle can be distributed based on a predetermined number or proportion of units of each cryptocurrency asset, the market size of the constituent cryptocurrency assets, or any other suitable parameter. In some embodiments, a multi-asset purchase option will appear to users as a "bundle". Once the user buys a "bundle", the underlying assets are transferred to their respective digital cryptocurrency wallets (hereinafter "wallets") and can be sold, sent, and received in the same manner as other cryptocurrency assets within wallets.

In one variation, a purchase order for a multi-asset purchase can generate an "Asset Bundle" asset type within the exchange. In some embodiments, the method includes rebalancing an Asset Bundle to maintain market capitalization after the user purchases the Asset Bundle. In some embodiments, the rebalancing is performed automatically and without user input. In differing embodiments, the rebalancing is performed periodically for a predefined time period, or upon the triggering of some event or condition within the cryptocurrency exchange, such as one or more of the assets in the bundle exceeding a predefined market cap threshold, or the addition of a new asset to the exchange.

All or portions of the method can be performed at a predetermined frequency, performed upon occurrence of an execution event (e.g., upon a user navigating to the cryptocurrency exchange, upon a user viewing a user dashboard on a user interface, upon a user receiving notification of available asset bundles for purchase, etc.), or performed at any suitable time.

2. Benefits.

This method can confer several benefits over conventional offerings of individual assets in cryptocurrency exchanges.

First, new assets are often added to cryptocurrency exchanges, and such new assets can be related to an existing asset bundle (or weighted asset bundle). In a first example, assets can be related as a result of a hard fork. In a second example, assets can be related as a result of an airdrop. In variations, the method provides a benefit of determining whether to add a new asset to an existing asset bundle, and automatically updating the asset bundle (e.g., by rebalancing) based on the addition of the new asset to the asset bundle. In this manner, a user does not need to take action when a new asset is added to the exchange.

Second, in cryptocurrency exchanges with conventional offerings of individual assets, novice customers who wish to invest in cryptocurrency assets are often hesitant because they don't know how much to invest and what to invest in. A reason that users within exchanges whom are ready to purchase but have not made a first purchase yet is related to a lack of confidence. For example, they may not know enough about cryptocurrency; may not know which assets to buy; or may need help using exchange platforms. These novice users can account for a large portion of users and potential users of a cryptocurrency exchange.

Embodiments herein provide the benefit of eliminating the problem of novice users or customers being hesitant to make a first purchase on an exchange by providing to user the purchase option of a bundle of predefined assets that is automatically weighted such that for each asset, the quantity is based on market cap or other metrics. This removes the need for a novice user to decide which assets to invest in and how much of each asset to invest in.

Third, novice users may not feel comfortable or feel that they know enough about how exchange platforms work to manage assets themselves, or may not feel confident having custody of those assets within digital wallets. In some embodiments, this method provides the benefit of assets in an asset bundle being managed by the cryptocurrency exchange itself, and also allows for custody of the assets on behalf of the user.

Fourth, novice users may not feel knowledgeable enough, confident enough, or know where to find information to rebalance assets they have purchased on an ongoing basis. In some embodiments, this method provides the benefit of assets in an asset bundle being automatically rebalanced for a user according to market cap or other metrics on an ongoing basis without the need for user input.

Sixth, embodiments herein provide a benefit of allowing users owning asset bundles to receive new assets resulting in forks or air drops. Embodiments herein overcome the technical problem of providing interfacing with an exchange system to automatically identify newly created assets resulting from forks and air drops, identifying instances of asset bundles that are related to such newly created assets, updating such asset bundle instances such that the users of these asset bundles can receive benefit of such newly created assets. In contrast to systems that do not include the technical solution described herein for automatically interacting with an exchange system to add newly added assets to asset bundles, such newly added assets might need to be manually added to provide the user the benefit of such newly created assets.

3. System.

Figure 1:
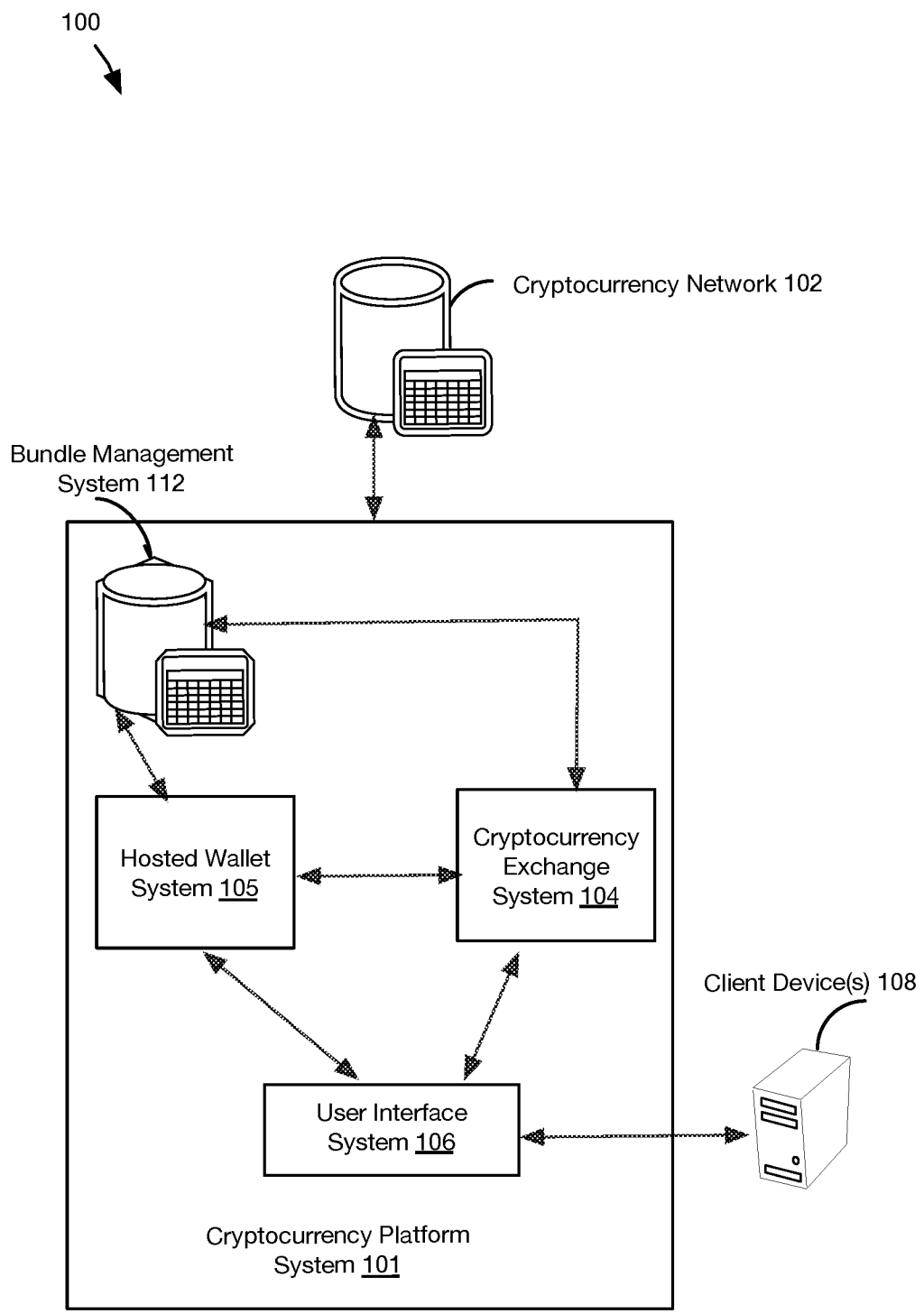
FIG. 1 is a schematic representation of cryptocurrency platform system, in accordance with variations.

As shown in FIG. 1, the system 100 includes: at least one of a cryptocurrency platform system (e.g., 101), a cryptocurrency network (e.g., 102), and a client device (e.g., 108).

Figure 5:
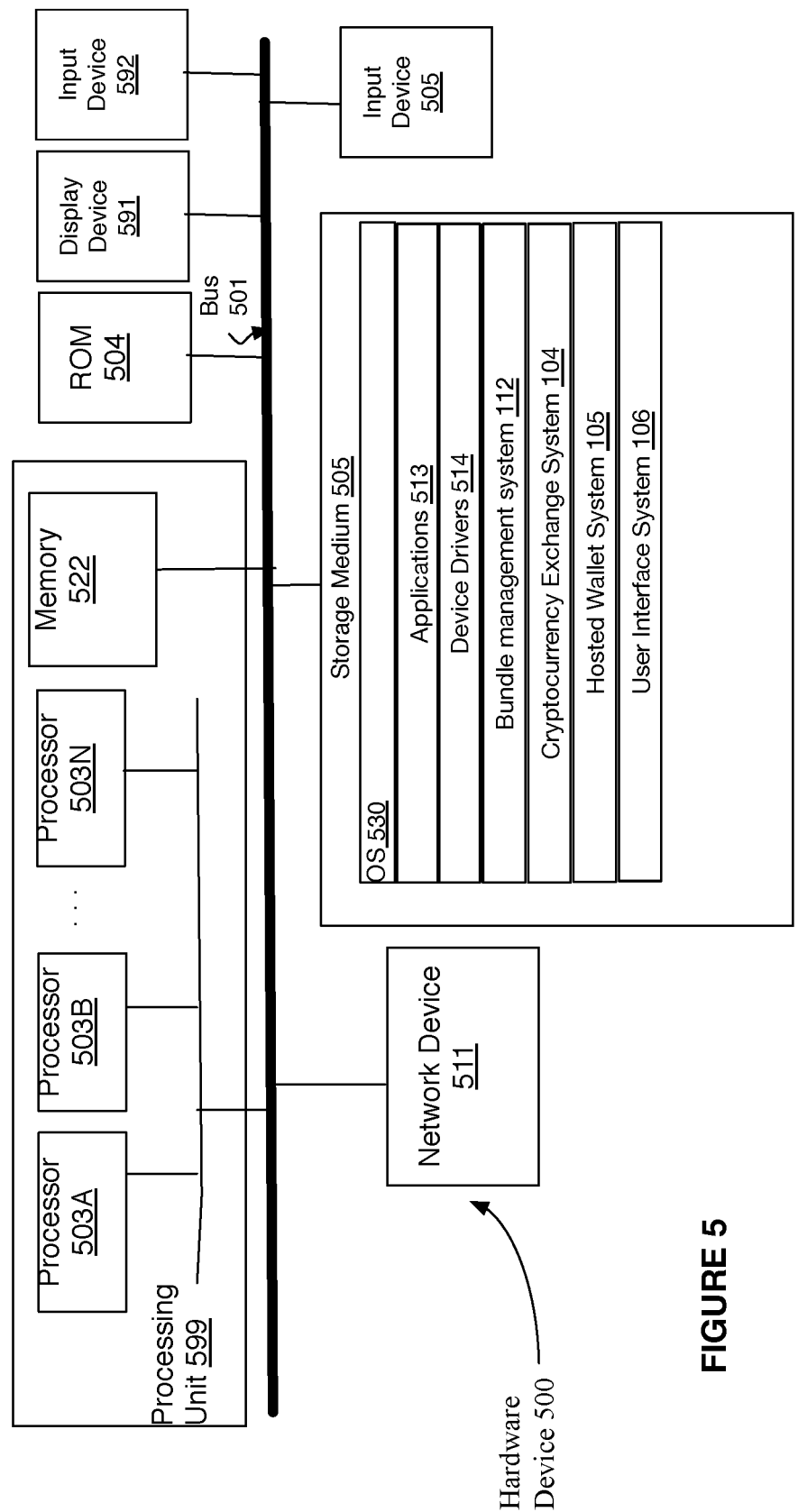
FIG. 5 is a schematic representation of computer architecture of a system, in accordance with variations.

In some implementations, the cryptocurrency platform 101 is implemented by one or more computing servers (e.g., 500 shown in FIG. 5) having one or more computer processors (e.g., graphics processor units (GPU), tensor processing unit (TPU), central processing units (CPUs, MCUs, etc.), or a combination of web servers and private servers).

In some variations, the cryptocurrency platform system 101 includes at least one of: a hosted wallet system (e.g., 105), a cryptocurrency exchange system (e.g., 104), a user interface system (e.g., 106), and an asset bundle management system (e.g., 112). The system 101 can optionally include or interface with the cryptocurrency network 102.

In some variations, the cryptocurrency network 102 functions to maintain a data structure (e.g., ledger, blockchain)

that records transactions for at least one cryptocurrency asset. In some variations, the network 102 is a network in which one or more digital cryptocurrencies are bought, sold, and/or transferred. In some variations, the network 102 is built on blockchain technology or similar technology. In some variations, the network 102 is a distributed network of nodes that execute node software that implements a protocol for managing data structure (e.g., ledger, blockchain) that records transactions for at least one cryptocurrency asset. In some variations, the cryptocurrency network 102 is an Ethereum network in which the digital cryptocurrency Ethereum is bought, sold, and/or transferred. In some variations, the Cryptocurrency network or Ethereum network is built on the ox protocol, with one or more smart contracts operating on top of the ox protocol smart contracts or in place of them.

In some variations, the cryptocurrency exchange system 104 functions to perform a transfer of a cryptocurrency from a source to a destination in response to a triggering event. In a first example, a triggering event includes transfer of fiat currency to an account of the exchange system 104. For example, in response to receiving $100 at a bank account of the exchange system 104 from a user of the platform system 101 in connection with a bitcoin "buy" operation, the exchange system transfers $100 worth of bitcoin from a bitcoin wallet of the exchange system 104 to a bitcoin wallet of the user. In a second example, a triggering event includes transfer of a first cryptocurrency to an account of the exchange system 104. For example, in response to receiving 1 BTC at bitcoin wallet of the exchange system 104 from a user of the platform system 101 in connection with an Ethereum "buy" operation, the exchange system transfers 1 BTC worth of Ethereum from an Ethereum wallet of the exchange system 104 to an Ethereum wallet of the user.

In a third example, a triggering event includes transfer of a first cryptocurrency to an account of a third party. For example, during an exchange of bitcoin for Ethereum between two users, the exchange system 104 processes a transfer of 1 BTC from a first user of the platform system 101 to a bitcoin wallet of a second user, and the exchange system 104 processes a transfer of an agreed upon amount of Ethereum from an Ethereum wallet of the second user to an Etherum wallet of the first user.

In some variations, the cryptocurrency exchange system 104 is a centralized cryptocurrency exchange; however, the exchange system 104 can alternatively or additionally be a decentralized cryptocurrency exchange. A centralized cryptocurrency exchange is a cryptocurrency exchange that manages the customer's funds, and is preferably implemented as an off-chain system. However, the centralized exchange can be otherwise configured. Alternatively, the exchange can be a decentralized exchange, where, transactions occur directly between users through an automated or semi-automated process. The transactions and/or associated processes (e.g., matching, fulfillment, verification, etc.) can be handled by: an off-chain system, a smart contract, or by any other suitable system. In some embodiments, the exchange generates proxy tokens, or cryptocurrency assets that represent a fiat currency or cryptocurrency. In some embodiments, the cryptocurrency tokens include one or more of Ether 106 (ETH), Bitcoin (BTC), ox (ZRX), or any other suitable cryptocurrency asset. In some embodiments, the cryptocurrency tokens include Wrapped Ether (W-ETH) or other ERC20-compatible tokens that can convert non-ERC20 compatible tokens to the ERC20 standard. In some implementations, the cryptocurrency exchange system 104 includes an off-chain application that interfaces with a blockchain via a blockchain interface (e.g., a blockchain node, a blockchain interface included in the cryptocurrency exchange, etc.). In some implementations, the cryptocurrency exchange system 104 functions to read data from the blockchain and write data to the blockchain (either directly, or indirectly via a blockchain node).

In some variations, the cryptocurrency exchange system 104 manages a predetermined volume of the cryptocurrency tokens for which trading is enabled. For example, if the exchange 104 enables trading for Ether, W-ETH, and ZRX, the exchange 104 can hold predetermined volumes of Ether, W-ETH, and ZRX. This pool of cryptocurrency tokens can be used to fill orders (e.g., buy orders), and can be replenished by filling orders (e.g., sell orders), or otherwise managed. In one variation, the asset values are associated with cryptocurrency addresses, associated with the exchange system 104, on the respective cryptocurrency networks (for the asset), wherein the smart contracts executing the trades can store and use said cryptocurrency addresses. However, the cryptocurrency exchange system 104 can otherwise access the assets. The predetermined volumes can be determined based on: the maximum trade size allowed by the exchange, the market demand for the asset (e.g., based on current or historic orders for the asset), but can alternatively or additionally be a static volume, or be otherwise determined.

In some variations, the hosted wallet system 105 functions to manage wallets for users of the cryptocurrency platform system 101. In some implementations, the hosted wallet system 105 includes an off-chain application that interfaces with a blockchain via a blockchain interface (e.g., a blockchain node, a blockchain interface included in the cryptocurrency exchange, etc.). In some implementations, the hosted wallet system 105 functions to read data from the blockchain and write data to the blockchain (either directly, or indirectly via a blockchain node). In some implementations, the hosted wallet system 105 manages at least some private keys for wallets managed by the hosted wallet system.

In some variations, the user interface system 106 functions to provide at least one of user interface to at least one client device (e.g., 108) (e.g., as shown in FIGS. 4A-F). In some implementations, the user interface system 106 functions to provide an Application Programming Interface (API). In some implementations, the user interface system 106 functions to provide a graphical user interface. In some implementations, the user interface system 106 functions to provide a web user interface. In some variations, the user interface system 106 functions to receive user input (or API calls) from a client device for performing at least one of: a purchase order request, and a transfer request. In some variations, the platform user interface functions to display a balance of at least one wallet managed by the hosted wallet system 105 on behalf of a user of the client device (e.g., 108). In some variations, a purchase order request is a request to purchase at least one cryptocurrency asset via the cryptocurrency exchange managed by the cryptocurrency exchange system 104.

In some variations, the asset bundle management system (e.g., 112) stores data related to asset bundles. In some variations, the asset bundle management system (e.g., 112) stores at least one of an asset bundle definition for an asset bundle and asset bundle information for at least one instance of an asset bundle (e.g., an asset bundle that has been purchased by a user). In some variations, the asset bundle management system (e.g., 112) stores bundle account information for each user. In some implementations, for each user, the bundle account information identifies a bundle account of the user for at least one asset. In some implementations, bundle accounts manage assets owned by a respective user, and maintain a respective balance for the asset.

FIGS. 6-12 are schematic representations of exemplary data stored by the asset bundle management system 112. FIG. 6 is a schematic representation of an exemplary data structure 600 that includes bundle account information for each user. As shown in FIG. 6, User A has accounts 1.001, 2.001, 3.001 and 4.001 for assets 1-4, respectively; User B has accounts 1.002, 2.002, 3.002 and 4.002 for assets 1-4, respectively; and User C has accounts 1.003, 2.003, 3.003, 4.003, 5.003, 6.003, 7.003 and 8.003 for assets 1-8, respectively. FIG. 7 is a schematic representation of an exemplary data structure 700 that includes asset bundle definitions. As shown in FIG. 7, the data structure 700 includes data for asset bundle definitions for bundles 1, 2, and 3. As shown in FIG. 8, Bundle 1 includes assets 1-4, Bundle 2 includes assets 1, 2, 5, 6, 7, and Bundle 3 includes assets 1, 5, 6, 7 and 8. FIG. 8 is a schematic representation of an exemplary data structure 800 that includes asset bundle information for five asset bundle instances. As shown in FIG. 8, User A has purchased "Asset Bundle 1", and this instance of the asset bundle 1 is assigned Bundle ID 1.001; User B has purchased "Asset Bundle 1", and this instance of the asset bundle 1 is assigned Bundle ID 1.002; User C has purchased "Asset Bundle 1", and this instance of the asset bundle 1 is assigned Bundle ID 1.003. User C has also purchased: "Asset Bundle 2", and this instance of the asset bundle 2 is assigned Bundle ID 2.001; and "Asset Bundle 3", and this instance of the asset bundle 3 is assigned Bundle ID 3.001.

FIGS. 9A, 9B and 9C are schematic representations of exemplary data structures 900A, 900B, and 900C that identify transactions for each bundle account of Users A, B, and C, respectively. As shown in FIG. 9A, bundle accounts 1.001, 2.001, 3.001, and 4.001 of user A have each received a contribution for asset bundle instance 1.001 of User A. As shown in FIG. 9B, asset accounts 1.002, 2.002, 3.002, and 4.002 of user B have each received a contribution for asset bundle instance 1.002 of User B.

As shown in FIG. 9C, asset accounts 1.003, 2.003, 3.003, and 4.003 of user C have each received a contribution for asset bundle instance 1.003 of User C; asset accounts 1.003, 2.003, 5.003, 6.003 and 7.003 of user C have each received a contribution for asset bundle instance 2.001 of User C; and asset accounts 1.003, 5.003, 6.003, 7.003 and 8.003 of user C have each received a contribution for asset bundle instance 3.001 of User C. As shown in FIG. 9C, bundle account 1.003 has received contributions of BTC for each of bundle instances 1.003, 2.001 and 3.001. The BTC balance of bundle 2.001 can be determined by summing all contribution records of account 1.003 that have 2.001 as the bundle ID value.

In some variations, for at least one asset bundle definition (e.g., one of the bundle definitions shown in FIG. 7), the asset bundle management system 112 stores information identifying at least one of: an allocation strategy, a pricing strategy, and identifiers for each asset included in the asset bundle. In some implementations, for at least one asset bundle definition (e.g., one of the bundle definitions shown in FIG. 7), the asset bundle management system 112 stores metadata that describes the asset bundle (e.g., the investment strategy, characteristics of included assets, a description of the asset bundle, etc.)

In some variations, instances of asset bundles (e.g., instances 1.001, 1.002, 1.003, 2.001, and 2.003 shown in FIG. 8) inherit properties of the related asset bundle definition. For example, an instance of a Privacy Coin asset bundle (e.g., Bundle 2) includes the assets (e.g., assets 1, 2, 5, 6, 7) identified by the asset bundle definition for the Privacy Coin asset bundle. In some variations, asset bundle definitions (e.g., Bundle 3) are generated based on received user input (e.g., received via the user interface system 106). In this manner, user-generated asset bundles can be defined. In some variations, the bundle management system stores a user identifier of a creator (e.g., "Author: User C") of a user-generated asset bundle.

In some variations, for at least one asset bundle instance (e.g., 1.003), the asset bundle management system 112 stores information identifying at least one of: an owner of the asset bundle (e.g., a user identifier, an identifier identifying the exchange as the owner, etc.), an allocation strategy, a pricing strategy, identifiers for each asset included in the asset bundle, and a balance for each asset included in the asset bundle. In some variations, each bundle has an allocation strategy, and users can have a many bundles with different allocation strategies. In some variations, for at least one asset bundle instance (e.g., 1.003), the asset bundle management system 112 stores information identifying at least one basket contribution (e.g., as shown in FIG. 9A). In some variations, each basket contribution identifies a "buy" for each asset of the bundle. For example, if the asset bundle includes four assets then the basket contribution for the bundle identifies four "buys" (e.g., contributions "01" for each of assets 1-4, as shown in FIG. 9A).

A bundle allocation strategy identifies information (or instructions) for determining in real-time how a new basket contribution is to be allocated across the assets of the bundle. For example, if $100 is contributed to a bundle, the allocation strategy determines how the $100 is distributed among the assets of the bundle. In a first implementation, the allocation strategy is determined such that the bundle has a certain ratio after the contribution is added to the bundle. For example, after a $100 contribution, the bundle should have a balance of 50% BTC and 50% ETH. In a second implementation, the allocation strategy determines what percentage of the contribution is added to each asset. For example, after a $100 contribution, add 70% of the contribution BTC and 30% of the contribution to ETH.

5. Method.

FIG. 2 is a flowchart representation the method 200. In some variations, the method includes at least one of: maintaining a cryptocurrency exchange (S210); receiving a purchase order request for an asset bundle (S220); determining a market capitalization value for at least one asset related to the purchase order request (S230); assigning a weight to at least one asset related to the purchase order request (S240); generating a weighted asset bundle related to the purchase order request (S250); processing a purchase order related to the purchase order request (S260); and updating an asset bundle related to the purchase order request (S270).

In some variations, at least one component of the cryptocurrency platform system 101 performs at least one of S210, S220, S230, S240, S250, S260 and S270 of the method 200.

In some variations, S210 includes the cryptocurrency exchange system 104 maintaining a cryptocurrency exchange with a number of cryptocurrency assets (e.g., Assets 1-8 shown in FIG. 7).

In some variations, the cryptocurrency exchange system 104 manages more than one cryptocurrency type. Cryptocurrency types represent the particular kinds of cryptocurrency assets offered by the exchange. Examples of cryptocurrency types are Bitcoin (BTC), Ethereum (ETH), and Litecoin (LTC). In some variations, the cryptocurrency assets within the exchange are offered for sale and/or purchase within the exchange. In some variations, the cryptocurrency platform system 101 maintains custody of the cryptocurrency assets for users until some triggering event or user request to take control of the assets occurs. In some variations, the cryptocurrency assets are securely stored by the hosted wallet system (e.g., in a secured hot-wallet, a cold storage, etc.). For example, the cryptocurrency platform system may securely store cryptocurrency assets for a user in one or more user accounts.

Figure 4B:
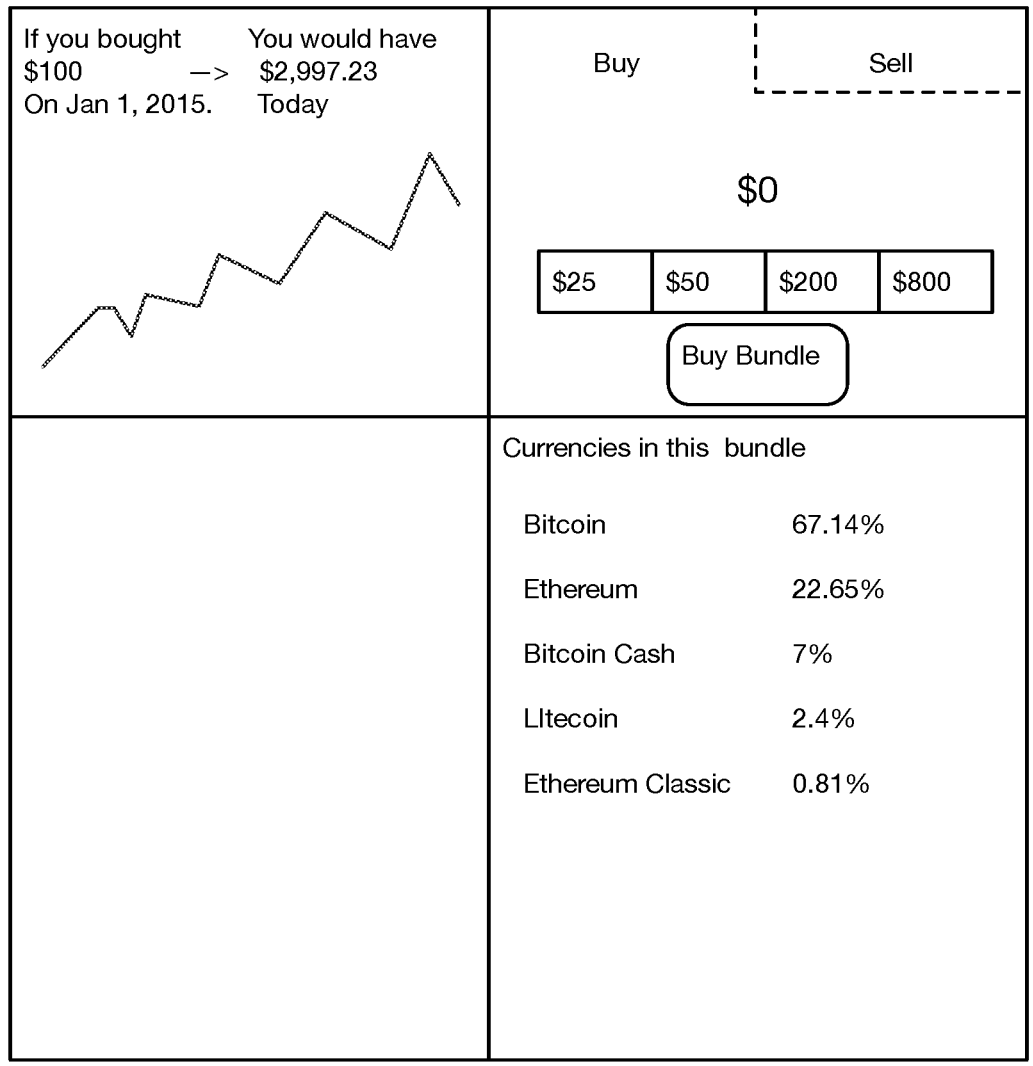

In some variations, the user interface system 106 presents a user interface (e.g., as shown in FIGS. 4A-F) for display on a client device (e.g., 108 shown in FIG. 1) associated with a user. In some variations, the user interface is presented as a 'dashboard' or control center with a variety of organized information, such as information about the user's cryptocurrency assets, recommendations on cryptocurrency assets or types to purchase, and more. In some variations, different options and information are presented depending on different user profiles, conditions, and behaviors. In a first example, customers that don't have any asset balance on the exchange will be presented with prominent promotional content on their dashboard user interface suggesting the option of purchasing an asset bundle as a way of starting a cryptocurrency portfolio (e.g., as shown in FIG. 4A). In a second example, customers with existing nonzero balances on the exchange, but not in asset bundles, will be presented with promotional content in a different, less-prominent section of the dashboard suggesting that the user buy asset bundles as a way of easily purchasing a variety or all of the cryptocurrency types offered on the cryptocurrency exchange. In a third example, customers that have an existing nonzero balance in one or more asset bundles will see the bundle balance in a portfolio widget on the dashboard. The bundle basket is separated from the individual asset balances.

In some variations, the user interface provided by the user interface system 106 displays an option to purchase an asset bundle for the user of the client device (e.g., as shown in FIG. 4B). In some variations, the user interface system 106 presents a purchase widget or purchase/sell widget that is customized to provide for a user to purchase asset bundles rather than individual cryptocurrency assets. In some variations, the widget allows the user to choose how much to initially invest by typing in an amount in traditional fiat currency such as USD. In some variations, the widget also provides an indication of the limit that the user can invest, depending on one or more funding sources of the user. In some variations, the widget provides an indication of the minimum the user can invest in order to purchase an asset bundle, such as $25 or $100. In some variations, the widget provides a suggested amount or amounts to invest. In some variations, the widget allows the user to choose from different funding sources.

In some variations, S220 includes the platform system 101 receiving a purchase order request from a user. In some variations, the purchase order request is generated upon a user of a client device (e.g., 108) interacting with a purchase widget or other interactive element in a user interface (e.g., provided by the user interface system 106) (e.g., the user interface shown in FIG. 4B) providing the option to purchase one or more asset bundles. In some variations, the purchase order request includes a desired order price and an asset bundle selection containing a subset of the available assets. The asset bundle selection can be a list of selected assets to purchase within the bundle, with a quantity for each asset. In some embodiments, the desired order price, asset bundle selection, or both can be predefined or automatically selected without user input. In one variation, the desired order price can be an amount of funds that the user has selected to allocate to purchasing the asset bundle, wherein the composition of the asset bundle (e.g., number of units of each constituent asset within the asset bundle) can be determined based on the: respective asset's weight within the bundle, the market price of the asset, and the desired order price. In a second variation, the asset bundles can be pre-packaged (e.g., include a predetermined distribution and number of each constituent asset), and be associated with a bundle price. In this variation, the user can purchase an asset bundle unit (or proportion thereof) for the bundle price (or a proportion thereof). In a third variation, the user can specify the number of units of each asset they would like to include in the asset bundle, wherein the desired order price can be determined based on the market price for each of the assets (e.g., current, projected, estimated) and the number of desired units. However, the asset bundle composition and/or price can be otherwise determined.

In some variations, S220 includes the platform system 101 receiving the purchase order request via the user interface system 106. In some variations, the purchase order request is a request for an initial purchase of an asset bundle. In some variations, the purchase order request is a request for a contribution to an existing asset bundle. In some variations, the purchase order request identifies an asset bundle. In some variations, for an initial purchase order request, the purchase order request includes an identifier of an asset bundle definition (e.g., "Bundle 3" shown in FIG. 7). In some variations, for a contribution to an existing bundle, the purchase order request includes an identifier of an asset bundle instance (e.g., "Bundle ID 1.003" shown in FIG. 8) that was generated as a result of an initial purchase order request. In some variations, S220 includes receiving selection of a "follow user" identifier (e.g., "User C"), and identifying at least one asset bundle definition defined by the selected user (e.g., Bundle 3 Definition, defined by User C, as shown in FIG. 7). In this manner, a user can "follow" the investment strategy of another user by selecting an asset bundle definition defined by the user. In some implementations, the user interface system 106 includes a display that includes a "follow user" interface element to "follow" an existing user, wherein the "follow user" interface element receives user selection of a purchase amount and a "follow user", and automatically generates a purchase order request to purchase the same asset bundles owned by the "follow user" (using the purchase amount).

In some variations, S230 includes, responsive to the purchase order request received at S220, the cryptocurrency exchange system 104 determining a market capitalization value for each asset of the asset bundle identified in the purchase order request.

In some variations, the cryptocurrency exchange system 104 determines a market capitalization value for an asset by selecting one or more sources that are capable of transmitting real-time or updated market information on cryptocurrency assets. In some implementations, the cryptocurrency exchange system 104 selects stock asset information and calculates the market capitalization value for the asset based on the number of existing cryptocurrency tokens for the cryptocurrency type and the current value of a token of the cryptocurrency type. In some implementations, the market capitalization value is determined based on one or more pieces of information on the cryptocurrency type or cryptocurrency asset that are stored in one or more databases within the system 101 that are accessible by the system 104. In a first example, the system 101 maintains a database of up-to-the-minute or real-time value of a given cryptocurrency type or cryptocurrency bundle. The cryptocurrency exchange system 104 then queries for the value of the cryptocurrency type or bundle and calculates a market capitalization value based on the results of the query. In some implementations, the cryptocurrency exchange system 104 determines market capitalization values for each asset within the asset bundle individually or as a group.

In some variations, S240 includes, the cryptocurrency exchange system 104 assigning distributed weights to each of the assets in asset bundle. In some variations, the cryptocurrency exchange system 104 assigns distributed weights according to an allocation strategy or multiple allocation strategies associated with the weighted asset bundle within the system. In some variations, a generated weighted asset bundle is associated with one or more allocation strategies. Allocation strategies are methods for how the system assigns distributed weights to each of the assets in the subset of assets. Distributing weights based on market capitalization values is one allocation strategy. In some variations, a single user can have multiple weighted asset bundles with different allocation strategies.

In some variations, the cryptocurrency exchange system 104 determines individual weights for each of the assets based on the market capitalization values (determined at S230) for each asset within the asset bundle. In other variations, the cryptocurrency exchange system 104 determines individual weights for each of the assets according to some metric other than market capitalization values. In a first example, the cryptocurrency exchange system 104 determines individual weights for each of the assets according to a user-configured value assigned to the assets or some internal weighting system of the exchange. In some variations, the individual weights are determined in a distributed fashion relative to the market capitalization values of the others assets or other metric related to the other assets. In some variations, distributed weights of each of the assets are determined based on one or more aspects of the user profile of the user associated with the purchase order request or one or more behavioral traits or historical behaviors of the user associated with the purchase order request.

In some variations, the cryptocurrency exchange system 104 assigns weights based on a particular methodology within the exchange. In some variations, the cryptocurrency exchange system 104 assigns weights based on an index fixed supply methodology. Within this methodology, the exchange tracks the combined financial performance of all of the cryptocurrency assets listed for trading in one or more regions and stores them in an index. The components of the index are weighted by market capitalization, defined as price multiplied by supply. The index is designed to be a benchmark for the overall performance of its constituent assets stored in an asset bundle. The index level of the index takes into account the latest price and supply of each of its constituent assets. In some embodiments, the constituent assets are weighted by their relative USD market capitalizations or other fiat market capitalization values, also referred to as "total network value". The weighting of a constituent asset in the index is its fiat market capitalization divided by the aggregate of the USD market capitalizations of all the constituent assets. The market capitalization of each constituent asset is calculated as the price of the asset multiplied by the supply of the asset. The price for each constituent asset is the last trade price on the exchange USD order book for that asset. The supply of each constituent asset is defined as the total number of units that have been created since the first block on the asset's blockchain. In some variations, supply is measured directly from the blockchain of each constituent asset, by querying a full node on that blockchain maintained by the exchange.

In some variations, S250 includes, the cryptocurrency exchange system 104 generating a weighted asset bundle containing the subset of assets. In some variations, the cryptocurrency exchange system 104 generates a weighted asset bundle based on the assigned distributed weights of the assets.

In some variations, S260 includes, the cryptocurrency exchange system 104 processing a purchase order of the weighted asset bundle for the user, wherein each asset in the bundle is purchased in quantities according to the desired order price modified by the assigned weight of the asset. In some variations, processing a purchase order includes purchasing assets on behalf of the user associated with the purchase order request in quantities proportional to the distributed weights of those assets. In some variations, the assets are purchased in a multi-asset purchase for a single total price. In some variations, the assets are purchased in a single atomic transaction. In some variations, the cryptocurrency exchange system 104 purchases assets by generating one or more purchase orders for the assets.

In some variations, the cryptocurrency exchange system 104 determines exchange fees or commission fees charged on the entire value of the new multi-asset purchase. In some variations, the exchange fees are allocated to the underlying assets in the basket, weighted by the amount of each asset purchased. For example, for a 1.5% commission, $1000 of a weighted asset bundle will cost a $15 commission fee, with 63% or $630 of the $1000 investment allocated towards purchasing BTC, and 63% or $9.45 of the $15 fee allocated to the BTC commission fee. In some variations, spread calculations and charges will operate will be recorded in a buy transfers table, and will be allocated to one or more parties within the exchange. In some variations, the exchange collects spread in lieu of any transaction fees. In some variations, the exchange collects a rebalancing fee, such as a monthly balancing fee or a fee per rebalancing. In some variations, the exchange collects a liquidation fee or sell fee when a user liquidates cryptocurrency assets or sells cryptocurrency assets.

In some variations, S260 includes transferring the purchased assets into user ownership.

In a first variation, the cryptocurrency platform system 101 custodies the assets owned by the user (e.g., by using the hosted wallet system 105). In a first implementation, the cryptocurrency platform system 101 maintains a central cryptocurrency wallet for each cryptocurrency asset, wherein units of the cryptocurrency asset (within a given wallet) are earmarked or recorded as owned by a user account on a separate ledger (e.g., managed by the asset bundle management system 112). In a second implementation, the cryptocurrency platform system 101 maintains multiple cryptocurrency wallets for at least one user (e.g., by using the hosted wallet system 105): one wallet for each cryptocurrency asset in the asset bundle. In this implementation, the purchased assets can be directly transferred from the exchange wallet (e.g., that maintains a pool of each asset to fulfill said orders), an external seller wallet (e.g., using an on-chain transaction), or another wallet hosted by the system (for the given cryptocurrency asset) to the wallets associated with the user (which are managed by the hosted wallet system 105).

In a second variation, the cryptocurrency platform system 101 does not custody the asset for the user, and instead facilitates direct, on-chain transfers between the sellers (e.g., for each of the set of cryptocurrency assets) and the user wallet(s) (e.g., using a distributed application, using a distributed exchange, etc.) by splitting the purchase order into multiple purchase orders, one for each constituent cryptocurrency asset of the bundle. However, cryptocurrency asset transfer to the user can be otherwise accomplished.

In variations in which the cryptocurrency platform system 101 custodies the assets owned by the user, S260 includes the cryptocurrency exchange system 104 transferring the purchased assets for the asset bundle to cryptocurrency bundle accounts (e.g., managed by at least one of the hosted wallet system 105 and the asset bundle management system 112). FIG. 6 shows exemplary bundle accounts assigned to users A, B and C. In some variations, the bundle accounts are included in at least one wallet managed by the hosted wallet system 105. In some variations, the bundle accounts are gated cryptocurrency accounts.

In some variations, a gated cryptocurrency account is similar to other cryptocurrency accounts for users within the exchange, but differs in that blockchain send and receive functionality are removed, such that there is no ability for a user to initiate a buy or sell for an individual the gated cryptocurrency account that is not related to a purchase or liquidation of an asset bundle. In some variations, a gated cryptocurrency account is an account that managed by the platform system 101 such that it only receives funds resulting from asset bundle purchase order, asset bundle contribution, and asset bundle rebalancing transactions, and such that the platform system 101 only transfers funds during bundle rebalancing transactions and user-initiated asset bundle liquidation transactions. In this manner, cryptocurrency assets are not transferred to a gated account except during operations related to asset bundle management, and cryptocurrency assets are not transferred from a gated account except during operations related to asset bundle management. In other words, a user cannot transfer cryptocurrency assets to a gated account apart from an asset bundle operation. In some implementations, the user interface system 106 limits user control of transfers to or from a gated account to transfers that are related to a purchase or liquidation of an asset bundle.

In some variations, when a user wishes to remove funds from a gated cryptocurrency account, the funds are transferred to a non-gated account to leave the exchange. Examples of non-gated accounts include a USD digital wallet or a regular cryptocurrency account within the exchange.

In some implementations, a bundle account is created per-asset and per-user, and all bundle assets are managed by a respective bundle account. In some implementations, exactly one bundle account is created per-asset for each user. In some implementations, at least one bundle account is a gated account. In some implementations, if a user purchases two different asset bundles that each include the same asset, a single bundle account for the user manages the asset for both asset bundles. In some examples of such instances, the bundle management system 112 records balances of the asset for each bundle (e.g., by using a ledger for the bundle account). For example, the bundle management system 112 can maintain a ledger for each bundle account, and the ledger identifies account contributions to the bundle account, wherein each account contribution is recorded with an asset bundle identifier that identifies an instance of an asset bundle. For example, as shown in FIG. 9C, User C has a bundle account 1.003 for Asset 1 that manages Asset 1 for Bundles 1.003, 2.001, and 3.001. An asset balance for an asset bundle can be determined by identifying all account contribution (ACs) associated with the bundle identifier of the asset bundle, and adding all identified account contributions for the bundle identifier to produce the asset's balance within the asset bundle. For example, as shown in FIG. 9C, the asset balance of Asset 1 for Bundle 1.003 is 0.5 BTC, the asset balance of Asset 1 for Bundle 2.001 is 0.5 BTC, and the asset balance of Asset 1 for Bundle 3.001 is 0.5 BTC.

In some implementations, for an initial purchase of an asset bundle or a contribution to an existing bundle, S260 includes the cryptocurrency exchange system 104 accessing an identifier for a bundle account (e.g., Bundle Account 1.003 for User C shown in FIG. 9C) for the related user for each asset of the asset bundle. The cryptocurrency exchange system 104 transfers assets to respective ones of the bundle accounts identified by the accessed identifiers cryptocurrency accounts. For each bundle account, the bundle management system 112 records an account contribution (AC) for the respective transfer, and the bundle management system 112 records an asset bundle identifier for the asset bundle with the account contribution. For example, as shown in FIG. 9C, the bundle management system 112 records an account contribution (AC) ("01 Contribution: 0.5 BTC") for the respective transfer, and the bundle management system 112 records an asset bundle identifier (Bundle ID=1.003) for the asset bundle with the account contribution.

In some implementations, accessing an identifier for a bundle account (e.g., during a first asset bundle purchase for a user) includes generating the bundle account (e.g., Asset 1 Bundle Account 1.003), wherein the identifier (e.g., 1.003) is generated during generation of the account. In some implementations, generating the account includes storing data (e.g., 600 shown in FIG. 6) associating the generated account with a user account of the platform system 101. For example, as shown in FIG. 6, data 600 associates the account 1.003 with User C. In some implementations, the bundle management system 112 generates the account. In some implementations, the bundle management system 112 controls the hosted wallet system 105 to generate the account. In some implementations, for a purchase of an asset bundle including an asset for which a bundle account has already been created, or for a contribution to an existing bundle, a bundle account has already been created for the asset for the user. In such cases, a new bundle account (e.g., gated account) does not need to be generated. For example, as shown in FIG. 9C, Asset 1 Bundle Account 1.003 is created for the purchase of Bundle ID 1.003, since User C does not already have a bundle account for Asset 1; for the purchase of Bundle ID 2.001 (which includes Asset 1), the bundle account for Asset 1 (e.g., account 1.003) already exists and therefore does not need to be generated.

In some implementations, accessing an identifier (e.g., 1.003) for a bundle account includes: accessing an identifier for an existing bundle account for an asset included in an asset bundle instance. In some implementations, accessing an identifier for a bundle account includes: the cryptocurrency exchange system 104 requesting a bundle account identifier for each asset of an asset bundle and the bundle management system 112 providing the cryptocurrency exchange system 104 with each requested bundle account identifier. In some implementations, the bundle management system includes a data structure (e.g., 600 shown in FIG. 6) that, for each user, identifies bundle account identifiers for each bundle account that has been generated for the user. For example, as shown in FIG. 6, data structure boo shows bundle account identifiers of bundle accounts generated for each of users A, B and C.

In some variations, S260 includes accessing an asset bundle identifier (e.g., 1.003) for an asset bundle related to the purchase order request. In some variations, the purchase order request received at S220 identifies the asset bundle identifier. In some variations, the purchase order request received at S220 identifies an asset bundle definition (e.g., "Bundle 1 Definition", "Bundle 2 Definition", "Bundle 3 Definition" shown in FIG. 7) and a user identifier (e.g., "User A", "User B", "User C), and the bundle management system 112 includes a data structure that includes asset bundle identifiers for instances of the asset bundle definition that are owned by the user identified by the user identifier. For example, as shown in FIG. 7, the bundle management system 112 manages a data structure 700 that includes bundle definitions for "Bundle 1", "Bundle 2", and "Bundle 3". Each bundle definition shown in FIG. 7 identifies assets included in the respective bundle. For example, as shown in FIG. 8, the bundle management system 112 includes a data structure Boo that includes asset bundle identifiers for instances of the asset bundle definitions owned by users of the platform system 101. As shown in FIG. 8, User A owns instance 1.001 of Bundle 1, User B owns instance 1.002 of Bundle 1, and User C owns instances 1.003, 2.001, and 3.001 of Bundle 1, Bundle 2, and Bundle 3, respectively.

In some implementations, if an asset bundle identifier for the asset bundle defined by the definition does not exist for the user, then the bundle management system 112 generates a new asset bundle identifier (e.g., 3.001 shown in FIG. 8). In some implementations, at S220 the purchase order request identifies a user that is purchasing the asset bundle, and at S260 the bundle management system 112 updates a data structure (e.g., 800 shown in FIG. 8) to record a new asset bundle identifier (e.g., 3.001) for the user identified by the purchase order request.

In some variations, users can "follow" investment activities of other users by selecting to purchase bundles created by the user being followed. In some variations, a user creating a bundle can modify the bundle that they had created, and such changes are propagated to bundles owned by other users following the user creating and managing the bundle.

In some variations, the purchase order request received at S220 identifies a user identifier and a "follow user" identifier associated with the purchase order request, wherein the bundle management system 112 identifies at least one bundle definition generated by the "follow user". FIG. 7 shows an exemplary bundle definition ("Bundle 3") created by User C, and a purchase order request can identify a bundle by the user identifier of the bundle creator (e.g., "User C"), rather than explicitly identifying Bundle 3 as the bundle to be purchased.

In some variations, the cryptocurrency platform system 101 is configured to automatically make one or more recurring investments in a weighted asset bundle on behalf of a user without the input of the user. In some variations, these investments occur periodically after a set amount of time has passed. In some variations, a recurring deposit can be set up such that the cryptocurrency platform system 101 invests in a weighted asset bundle in order to maintain a current ratio of the bundle, such as when a user associated with the bundle has predefined a desired distribution of assets within the bundle.

In some variations, the balances of each asset in an asset bundle instance are determined by identifying all accounts associated with the asset bundle instance (e.g., as identified by the bundle management system 112); for each asset a balance is determined by identifying all account contributions for the asset that are recorded in association with the identifier for the asset bundle, and adding the balances of the account contributions associated with the asset bundle identifier.

In some variations, bundle accounts are generated for each new instance of an asset bundle. For example, for a new instance of a bundle that includes Assets 1 and 2, a new bundle account for Asset 1 and a new bundle account for Asset 2 are created. In such variations, the balance of a bundle account is the bundle's balance for the corresponding asset.

In some variations, the cryptocurrency platform system 101 rebalances one or more of the weighted asset bundles. In some variations, rebalancing includes at least one of increasing a balance of at least one asset of the asset bundle and decreasing a balance of at least one asset of the asset bundle. In some variations, rebalancing includes processing at least one transfer to an existing bundle account of an asset of the asset bundle. In some variations, rebalancing includes processing at least one transfer from a bundle account of the asset bundle. In some variations, rebalancing includes processing a transfer from a first bundle account for a first asset of the asset bundle to an exchange account of the cryptocurrency exchange system 104, and processing a transfer from an exchange account (of the cryptocurrency exchange system 104) for a second asset of the asset bundle to a second bundle account for a second asset of the asset bundle. In this manner, the second asset is purchased by using the first asset, thereby rebalancing the bundle by reducing a balance of the first asset and increasing a balance of the second asset. In some variations, each rebalancing transaction is recorded by the bundle management system 112 as a bundle adjustment.

In some variations, the cryptocurrency platform system 101 rebalances the weighted asset bundles in order to maintain market capitalization weighted distribution for the individual cryptocurrency assets as the supply of the various assets changes over time. In some variations, rebalancing is required to maintain a specific distribution of cryptocurrency assets, even if the prices of the assets change. In some variations, a rebalancing occurs when the cryptocurrency platform system 101 receives indication of one or more triggering events being triggered by one or more components, client devices, or objects in the system. One example of a rebalancing event is when the weighted asset bundle drifts from a market capitalization weighted distribution. Another example is when a new cryptocurrency type is added to a cryptocurrency exchange (managed by the exchange system 104), and the user wishes to add that cryptocurrency to the weighted asset bundle in a specified amount. Another example is when a new cryptocurrency type is added to a cryptocurrency exchange (managed by the exchange system 104) as a result of a fork in blockchain software for a cryptocurrency, and the forked cryptocurrency is added to the weighted asset bundle.

The asset bundle can be rebalanced: at a predetermined frequency (e.g., once a year, once a month), when a predetermined condition is met (e.g., an asset value exceeds or falls below an asset weight threshold, a new asset is automatically added to the bundle), upon user input receipt, or at any other suitable time.

In some variations, a user of a client device (e.g., 108) is prompted to rebalance when a weighted asset bundle associated with the user no longer matches the initial distribution. In some variations, the cryptocurrency platform system 101 can prompt the user via email, an in-application messaging system, a notification, an alert, or other form of communicating with the user.

In some variations, the cryptocurrency platform system 101 automatically rebalances a weighted asset bundle without any input from the user associated with the weighted asset bundle. In some variations, the cryptocurrency platform system 101 automatically rebalances the weighted asset bundle periodically after a predefined amount of time has passed. In some variations, the cryptocurrency platform system 101 rebalances the bundle to match a market capitalization weighting ratio. In some variations, the cryptocurrency platform system 101 rebalances the bundle to match a ratio that has been set by the user associated with the bundle.

Figure 3:
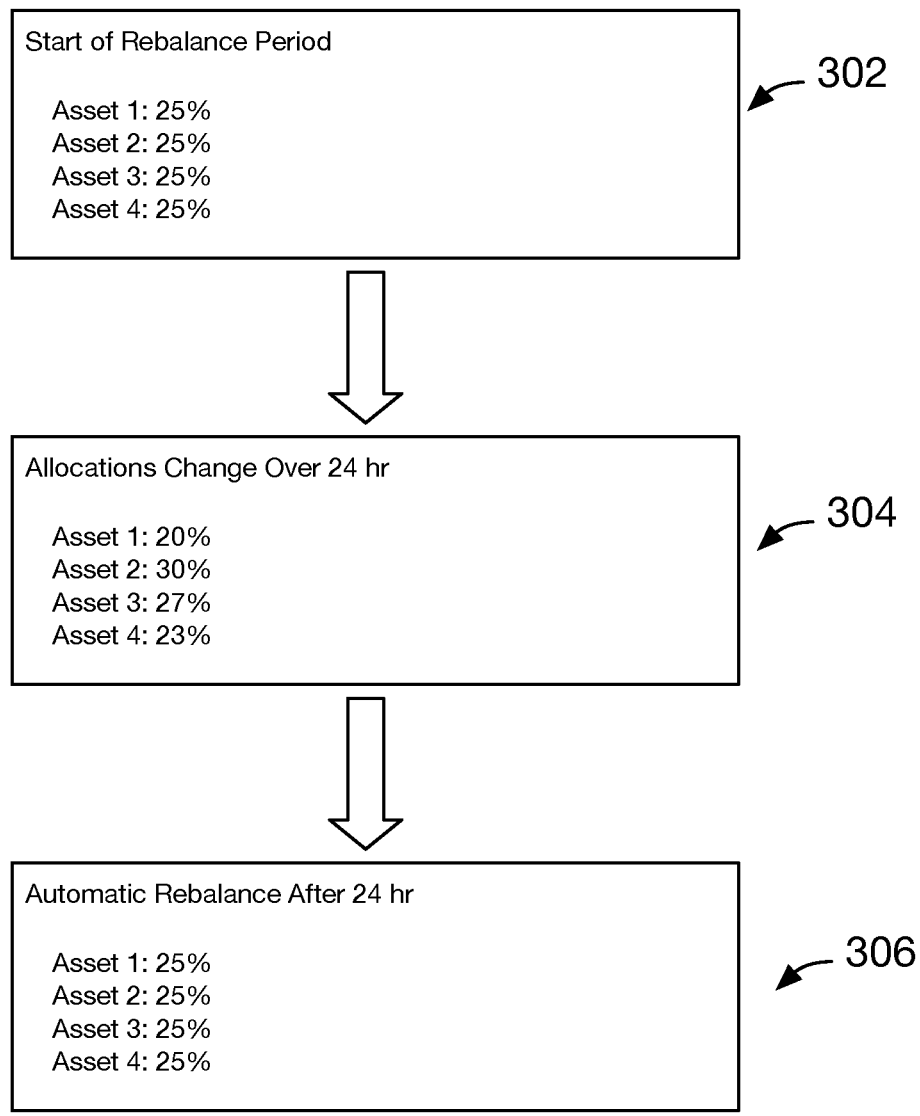
FIG. 3 is an illustration of an example of automatic rebalancing, in accordance with variations.

FIG. 3 is an illustration of an example of automatic rebalancing of a weighted asset bundle. The process depicted in the example is for a weighted asset bundle which has been predefined to maintain a specific equally weighted distribution of cryptocurrency. At the start of the rebalance period as depicted at 302, the weighted asset bundle includes four cryptocurrency assets, each assigned even distribution weights of 25%. As depicted at 304, over a period of 24 hours, the allocations of the assets within the bundle change as market capitalization values of the assets change. As depicted at 306, the system performs an automatic rebalancing of the weighted asset bundle after 24 hours to once again evenly distribute the weights at 25% for each of the four assets in the asset bundle.

S270 functions to update at least one asset bundle. In some variations the bundle management system performs at least a portion of S270. In some variations the hosted wallet system 105 performs at least a portion of S270. In some variations the exchange system 104 performs at least a portion of S270.

In some variations, S270 includes updating at least one centralized asset bundle (e.g., an asset bundle managed on behalf of the exchange system 104). In some variations, S270 includes updating at least one user asset bundle (e.g., an asset bundle managed on behalf of a user of the platform system 101).

In some variations, S270 includes at least one of: identifying a new asset (S271), determining if a new asset is related to an asset bundle (S272), adding a new asset to an asset bundle (S273), adding a new wallet for a new asset (S274), rebalancing an asset bundle (S275), and providing a notification for addition of a new asset to an asset bundle (S276).

S271 functions to identify a new asset. In some implementations, a new asset is added to the exchange (managed by the exchange system 104) by updating software of the cryptocurrency exchange system 104 to support the new asset (e.g., by adding machine executable instructions of a cryptocurrency wallet for the new asset). In some implementations, a new cryptocurrency asset is added to the exchange as a result of a fork (e.g., a hard fork). In some implementations, the cryptocurrency platform 101 identifies a new asset in response to receiving a notification from the exchange system 104. In some implementations, at least one of the asset bundle management system 112 and the hosted wallet system 105 receives the notification from the exchange system 104. In some implementations, the notification identifies assets related to the newly added asset. In some implementations, the notification includes information about the new asset.

Figure 10:
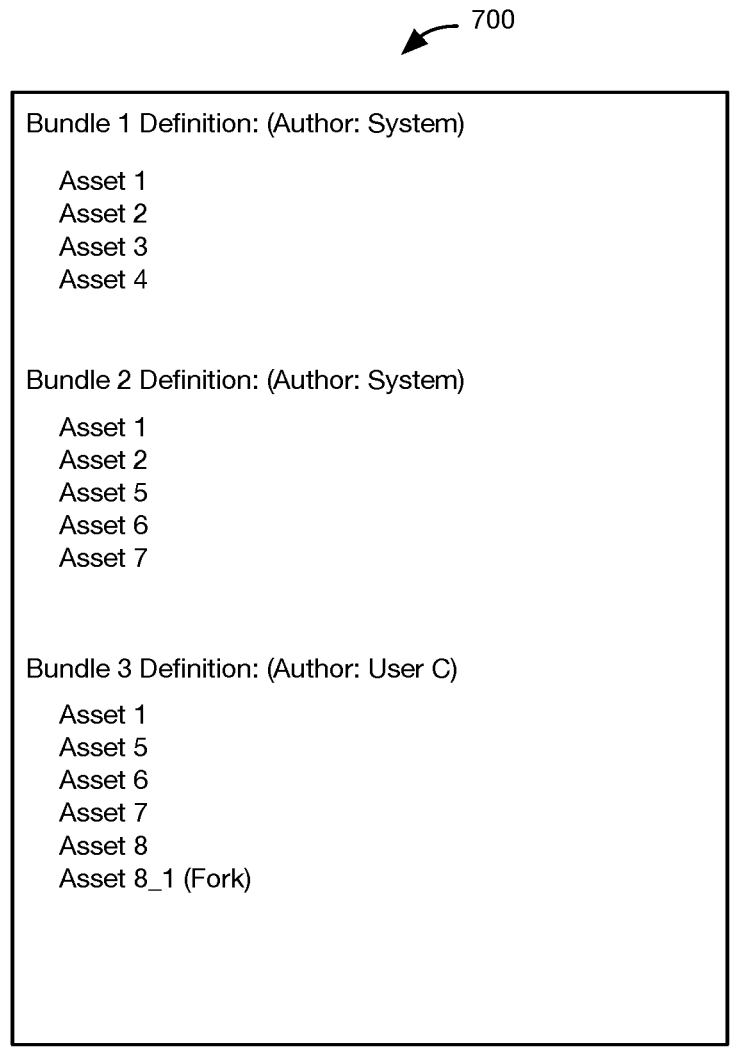

S272 functions to determine if the new asset identified at S271 is related to an asset bundle managed by the asset bundle management system 112. In some variations, at least one of the asset bundle management system 112, the wallet system 105, and the exchange system 104 performs S272. In some variations, the exchange system 104 determines that a new asset is a result of a blockchain fork. The exchange system 104 determines that the new asset is related to the pre-fork asset (the asset managed by the pre-fork version of the forked blockchain. In some variations, if the pre-fork asset is included in an asset bundle, then the new asset (related to the pre-fork asset) is determined to be related to the asset bundle. For example, as shown in FIG. 10, there is a fork in the blockchain code for Asset 8, resulting in a new, forked Asset 8_1, which is related to Asset 8 by virtue of the fork relationship.

In some variations, responsive to a new asset notification received from the exchange system 104, the bundle management system 112 determines whether the new asset identified by the notification is related to an asset included in an asset bundle managed by the asset bundle management system 112. In some implementations, the notification identifies related assets. In some implementations, the notification includes information (e.g., metadata) describing the new asset (e.g., the asset is a new privacy coin, etc.), and the bundle management system 112 determines whether the new asset identified by the notification is related to an asset bundle based on the description (e.g., metadata). For example, a new privacy coin asset can be determined to be related to a privacy coin bundle that includes a plurality of privacy coins.

In some implementations, responsive to a new asset notification received from the exchange system 104 that identifies addition of a new forked asset (e.g., Asset 8_1) related to a pre-fork asset (e.g., Asset 8), the bundle management system 112 determines whether any asset bundles managed by the asset bundle management system 112 include the pre-fork asset (e.g., Asset 8). In response to identifying an asset bundle (e.g., Bundle 3) managed by the asset bundle management system 112 that includes the pre-fork asset (e.g., Asset 8), the bundle management system 112 determines that the new asset is related to the identified asset bundle. FIG. 7 shows an exemplary data structure 700 that identifies asset bundles managed by the bundle management system 112, and assets included in each bundle.

S273 functions to add the new asset to at least one asset bundle related to the new asset. In some variations, responsive to determining that the new asset is related to an asset bundle, the asset bundle management system 112 updates the definition for the related bundle to include the new asset. For example, as shown in FIG. 10, there is a fork in the blockchain code for Asset 8, resulting in a new, forked Asset 8_1, which is related to Asset 8 by virtue of the fork relationship. Since Bundle 3 includes Asset 8, forked Asset 8_1 is related to Bundle 3, and the asset bundle management system 112 updates the definition for Bundle 3 to include Asset 8_1.

In some implementations, the new asset is added to a related asset bundle in response to a determination that configuration for the asset bundle permits addition of related assets. In such implementations, asset bundle configuration includes a related-asset setting for at least one asset of the bundle, wherein each related-asset setting identifies whether new assets related to the asset are to be added to the asset bundle. In this manner, a bundle can be configured such that it is not updated in response addition of a new asset at the exchange system 104.

S274 functions to add at least one new cryptocurrency wallet for a new asset. In some variations, S274 includes creating a new bundle account for the new asset. In some variations, responsive to determining that the new asset is related to an asset bundle, the asset bundle management system 112 identifies users that own instances of the asset bundle that is related to the new asset. For example, as shown in FIG. 8, User C owns an instance of Bundle 3, which is related to new Asset 8_1. For each user owning an instance of the related asset bundle, the bundle management system 112 creates a cryptocurrency wallet for the new asset. In some variations, the bundle management system 112 uses the hosted wallet system 105 to create the new wallet. In some implementations, creating a new wallet for a user includes creating a new bundle account for the user, wherein the newly created wallet manages the new bundle account. For example, as shown in FIG. 11, a new bundle account 8_1.003 is created for User C for new Asset 8_1. Since User A and User B do not own instances of a bundle related to new Asset 8_1, a new bundle account is not created for User A or User B.

In some implementations, S274 includes transferring an amount of the new asset to at least one bundle account created for the new asset. For example, as shown in FIG. 12, a contribution of 0.1 XTZ_Fork (the newly added Asset 8_1) is added to the new bundle account 8_1.003 that was created for User C. In some implementations, for each user for which a new bundle account is created in response to the new asset, S274 includes transferring an amount of the new asset to the bundle account created for the new asset for each bundle instance of the user that is related to the new asset. For example, as shown in FIG. 12, a contribution of 0.1 XTZ_Fork (the newly added Asset 8_1) is added to the new bundle account 8_1.003 (that was created for User C) for Bundle ID 3.001. In a case where User C owns another bundle (e.g., 4.001) related to asset 8_1, then a contribution of the newly added Asset 8_1 is also added to the new bundle account 8_1.003 (that was created for User C) for the other bundle (e.g., 4.001). In other words, in some implementations, a user receives a contribution for the new asset for each bundle owned by the user that is related to the new asset. In some implementations, S274 includes determining the amount of the new asset to be transferred to the bundle account of the new asset. In some implementations, the amount of the new asset to be transferred to the bundle account of the new asset is determined based on a balance of a related asset that is included in the related asset bundle.

S275 functions to rebalance instances of at least one asset bundle related to a newly added asset. In some variations, responsive to determining that the new asset is related to an asset bundle, the asset bundle management system 112 identifies users that own instances of the asset bundle that is related to the new asset. For at least one user that owns an instance of an asset bundle that is related to the new asset, rebalancing is performed. In some implementations, the rebalancing is performed in accordance with new-asset-rebalancing configuration information. New-asset-rebalancing configuration information can be set per user, per user group, or globally for a bundle definition. In some variations, rebalancing the asset bundle includes rebalancing the asset bundle to update the balance of at least one asset in the bundle based on balances of the assets in the asset bundle and rebalancing configuration information for the asset bundle.

In a first implementation, the new asset is treated as part of the related original asset, and rebalancing is performed as if the amount of the related original asset were increased (e.g., the values of the original asset and the related new asset are combined and treated as a single asset value for purposes of rebalancing). In some examples, automatically rebalancing is performed by rebalancing the asset bundle to update the balance of at least one asset in the bundle based on a combined balance of the new asset at least one asset (of the bundle) that is related to the new asset. For example, as shown in FIG. 12, the balances of Asset 8 and Asset 8_1 for Bundle ID 3.001 are combined, and the asset bundle instance 3.001 is rebalanced as if the balance of Asset 8 were increased to 0.6 XTZ, using the original allocation strategy for the bundle instance 3.001.

In a second implementation, the new asset is treated as distinct from the related original asset. In some examples, automatically rebalancing is performed by rebalancing the asset bundle to update the balance of at least one asset in the bundle based on a balance of the new asset. For example, as shown in FIG. 12, the asset bundle instance 3.001 is rebalanced using rebalancing configuration information for the bundle instance 3.001 that defines how rebalancing is performed for the bundle instance in response to addition of a new asset to the bundle.

In some implementations, the new-asset-rebalancing configuration determines whether rebalancing is performed as if the amount of the related original asset were increased, or whether rebalancing is performed as if the new asset distinct from the related original asset.

In some variations, new-asset-rebalancing configuration can specify that rebalancing is not performed in response to addition of a new asset to the bundle.

In some variations, S276 functions to notify a user of addition of a new asset to a bundle instance owned by the user. In some implementations, responsive to addition of a new asset to a bundle instance owned by a user, the user interface system 106 provides a notification to the user (e.g., via a user device 108). In this manner, a user can be updated of the fact that their bundle has been updated, and are informed such that when they view their bundle or liquidate their bundle, they are not surprised by the addition of a new asset to their bundle.

In some embodiments, the cryptocurrency platform system 101 is implemented as a single hardware device 500. In some embodiments, the cryptocurrency platform system 101 is implemented as a plurality of hardware devices (e.g., 500). In some embodiments, a hardware device implementing the cryptocurrency platform system 101 includes a bus 501 that interfaces with processors 503A-N, a main memory 522 (e.g., a random access memory (RAM)), a read only memory (ROM) 504, a processor-readable storage medium 505, and a network device 511. In some embodiments, bus 501 interfaces with at least one of a display device 591 and a user input device 592.

In some embodiments, the processors 503A-503N include one or more of an ARM processor, an X86 processor, a GPU (Graphics Processing Unit), a tensor processing unit (TPU), and the like. In some embodiments, at least one of the processors includes at least one arithmetic logic unit (ALU) that supports a SIMD (Single Instruction Multiple Data) system that provides native support for multiply and accumulate operations.

In some embodiments, at least one of a central processing unit (processor), a GPU, and a multi-processor unit (MPU) is included.

In some embodiments, the processors and the main memory form a processing unit 599. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip).

In some embodiments, the processing unit includes at least one arithmetic logic unit (ALU) that supports a SIMD (Single Instruction Multiple Data) system that provides native support for multiply and accumulate operations. In some embodiments the processing unit is a Central Processing Unit such as an Intel processor.

The network device 511 provides one or more wired or wireless interfaces for exchanging data and commands. Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system, application programs, and device drivers) are loaded into the memory (of the processing unit) from the processor-readable storage medium, the ROM or any other storage location. During execution of these software programs, the respective machine-executable instructions are accessed by at least one of processors (of the processing unit) via the bus, and then executed by at least one of processors. Data used by the software programs are also stored in the memory, and such data is accessed by at least one of processors during execution of the machine-executable instructions of the software programs. The processor-readable storage medium 505 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like.

In some variations, the storage medium 505 includes machine-executable instructions for at least one of an operating system 530, applications 513, device drivers 514, the bundle management system 112, the cryptocurrency exchange system 104, the hosted wallet system 105, and the user interface system 106.

6. FIGS. 4A-F.

FIGS. 4A-F are schematic representations of user interfaces related to asset bundling. In some variations, the user interfaces are displayed by the user interface system 106.

As shown in FIG. 4A, a user interface presenting a customized dashboard for a user of a cryptocurrency exchange is displayed on a client device (e.g., 108) associated with the user. The user has not invested using the exchange yet, which can be seen in the "Your Portfolio" section of the dashboard that shows a total balance of $0.00 and assets of $0.00 for each of the cryptocurrency types offered within the exchange. In addition, a "Recent Activity" section shows that the user has not bought or sold within the exchange yet, but the user has linked a payment method and can start buying digital currency within the exchange. The system registers that the user has a balance of $0.00 and has not bought or sold within the exchange yet, and because of this, the system presents an option for the user to purchase an asset bundle as a "convenient way to buy all 5 of the cryptocurrencies . . . with a single purchase." A button to view the bundle is presented to the user.

As shown in FIG. 4B, the user has clicked on the "view bundle" button, and in response is presented with information about the presented bundle option. On the right, a section depicts the currencies in this bundle, along with a percentage showing the weighted distribution of each of the individual assets within the bundle. A chart shows performance of the asset bundle over time. The chart also shows how much USD the user would have gained if they had invested $100.00 on the beginning date of the chart's date range. Different period ranges can be selected by the user to present different charts of performance over time. In some variations, a stacked chart of all the underlying assets of the bundle is shown instead of or in addition to a single line in the chart depicting the overall bundle performance. Different options to buy or sell a desired amount are presented to the user in the top right, along with options to purchase the bundle in amounts of $25, $50, $200, or $800.

Figure 4C:
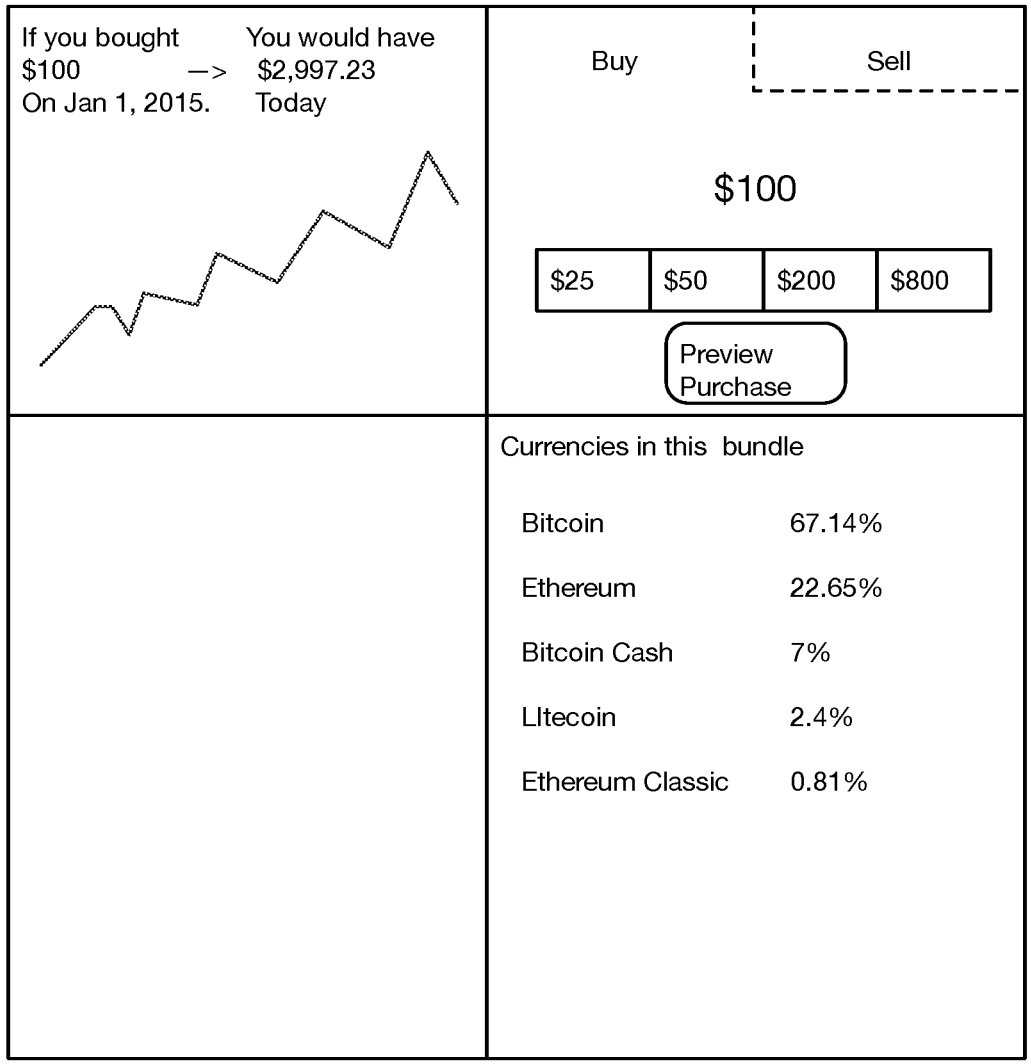

As shown in FIG. 4C, the user has indicated a desire to invest $100 in the weighted asset bundle. An option to preview the purchase is presented.

Figure 4D:
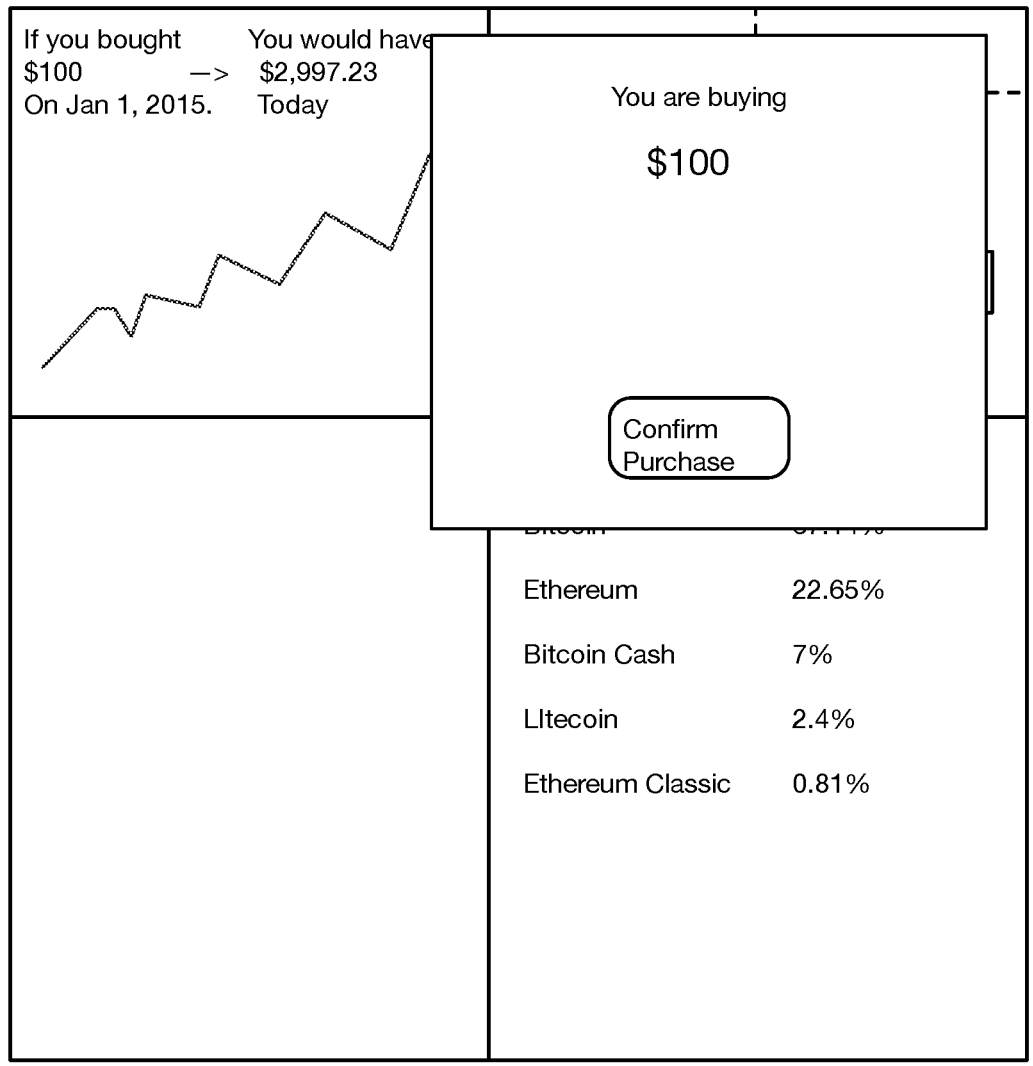

As shown in FIG. 4D, a preview of the purchase is shown after the user clicks on the "preview purchase" button. A button to confirm the purchase is presented to the user.

Figure 4E:
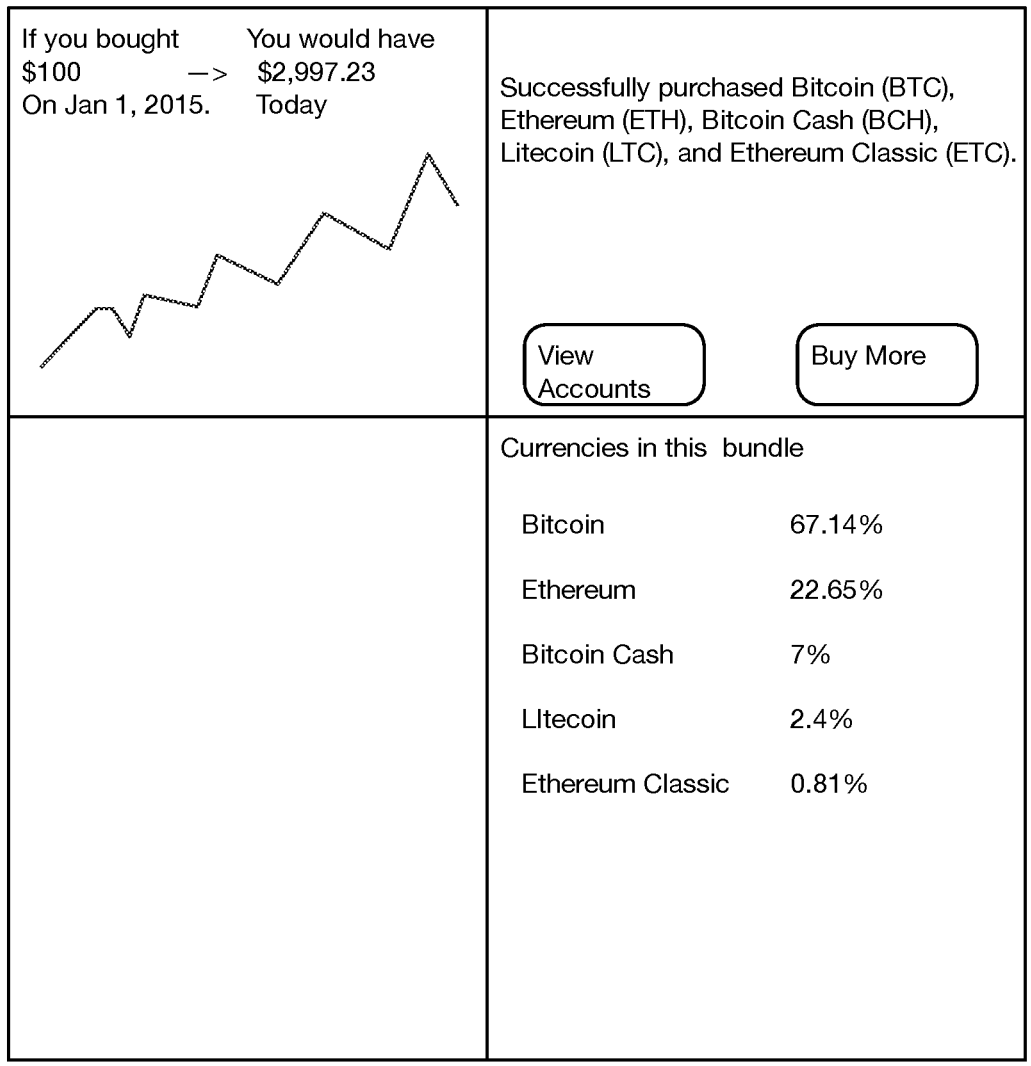

As shown in FIG. 4E, the user has clicked the "confirm purchase" button. The exchange transmits a purchase order request from the user, which is received by the system. The purchase order request includes a desired order price of $100 and an asset bundle selection containing a subset of the available assets of the cryptocurrency exchange, specifically Bitcoin, Bitcoin Cash, Ethereum, Ethereum Classic, and Litecoin. The system determines a market capitalization value for each asset in the subset of assets, and assigns distributed weights to each of the five assets. The system then generates a weighted asset bundle containing the subset of assets, and processes a purchase order of the weighted asset bundle for the user, wherein each asset in the bundle is purchased in quantities according to the desired order price of $100 modified by the assigned weight of the asset. A message is displayed that the bundle was successfully purchased by the user. Options to view the user's accounts or buy more are presented.

As shown in FIG. 4F, the user has clicked the button to view their accounts. A dashboard is once again presented to the user, but this time the dashboard shows a portfolio value, a portfolio with nonzero amounts invested in five different cryptocurrency types, and recent activity showing cryptocurrency assets bought in varying amounts. At this point, the user has various options within the exchange, including buying/selling, viewing charts of the performance of the bundle over various time periods, and more.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method comprising:
generating, by a user interface system of a cryptocurrency platform system, a user interface comprising an option to purchase an asset bundle;
providing the user interface to a client device;
receiving, by the user interface system and from the client device, a purchase order request for the asset bundle and an order price;
determining, by a cryptocurrency exchange system of the cryptocurrency platform system and for a first asset in the asset bundle, an amount of the first asset to be transferred to a bundle account that is assigned to a user associated with the purchase order request, the amount being determined based on the order price and allocation strategy information configured for the asset bundle;
transferring, by the cryptocurrency exchange system, the amount of the first asset to the bundle account;
automatically identifying, by the cryptocurrency exchange system, a creation of a new forked asset by monitoring updates to machine executable blockchain instructions for at least one cryptocurrency to identify creation of forked blockchain software for the at least one cryptocurrency, wherein creation of the forked blockchain software for the at least one cryptocurrency results in creation of the new forked asset;
adding, by the cryptocurrency exchange system and based on identifying the creation of the forked blockchain software, the new forked asset to the cryptocurrency exchange system,
providing, by the cryptocurrency exchange system, a new asset notification to a bundle management system of the cryptocurrency platform system, wherein the new asset notification identifies the creation of the new forked asset and the adding of the new forked asset to the cryptocurrency exchange system;
receiving, by the bundle management system and from the cryptocurrency exchange system, the new asset notification;
adding, by the bundle management system and to the asset bundle, the new forked asset; and
automatically rebalancing, by the bundle management system and based on adding the new forked asset to the asset bundle, the asset bundle.

2. The method of claim 1, wherein the cryptocurrency exchange system provides the new asset notification in response to an air drop for the new forked asset.

3. The method of claim 1, further comprising:
determining whether the new forked asset is related to the asset bundle based on an identification that the new forked asset is related to at least one asset included in the asset bundle.

4. The method of claim 3, wherein the new forked asset is added to the asset bundle responsive to the determination that the new forked asset is related to the asset bundle.

5. The method of claim 4, wherein automatically rebalancing the asset bundle comprises rebalancing the asset bundle to update a balance of at least one asset in the asset bundle based on a combined balance of the new forked asset and at least one asset related to the new forked asset.

6. The method of claim 3, wherein determining whether the new forked asset is related to the asset bundle comprises:
determining that metadata for the new forked asset is related to metadata of the asset bundle.

7. The method of claim 1, wherein automatically rebalancing the asset bundle comprises rebalancing the asset bundle to update a balance of at least one asset in the asset bundle based on a balance of the new forked asset.

8. The method of claim 1, wherein automatically rebalancing the asset bundle comprises rebalancing the asset bundle to update a balance of at least one asset in the asset bundle based on balances of assets in the asset bundle and rebalancing configuration information for the asset bundle.

9. The method of claim 1, further comprising providing a notification to the client device indicating the addition of the new forked asset.

10. The method of claim 1, further comprising:
generating a new bundle account for the user for the new forked asset;
determining an amount of the new forked asset to be transferred to the new bundle account; and
transferring the amount to the new bundle account.

11. The method of claim 10, wherein generating the new bundle account for the user for the new forked asset comprises:
generating a cryptocurrency wallet for the user for the new bundle account, wherein the cryptocurrency wallet manages the new bundle account.

12. A cryptocurrency platform system comprising:
a cryptocurrency exchange system communicatively coupled to at least one cryptocurrency network and configured to maintain a cryptocurrency exchange;
a bundle management system; and
a user interface system configured to:
generate a user interface comprising an option to purchase an asset bundle,
provide the user interface to a client device;
receive, from the client device, a purchase order request for the asset bundle and an order price;
wherein the cryptocurrency exchange system is further configured to:
determine, for a first asset in the asset bundle, an amount of the first asset to be transferred to a bundle account that is assigned to a user associated with the purchase order request, the amount being determined based on the order price and allocation strategy information configured for the asset bundle;
transfer, to the bundle account, the amount of the first asset;
automatically identify a creation of a new forked asset by monitoring updates to machine executable blockchain instructions for at least one cryptocurrency to identify creation of forked blockchain software for the at least one cryptocurrency, wherein creation of the forked blockchain software for the at least one cryptocurrency results in the creation of the new forked asset;
add, to the cryptocurrency exchange and based on identifying the creation of the forked blockchain software, the new forked asset; and
provide a new asset notification to the bundle management system, wherein the new asset notification identifies the creation of the new forked asset and the addition of the new forked asset to the cryptocurrency exchange; and
wherein the bundle management system is configured to:
receive, from the cryptocurrency exchange system, the new asset notification;
add, to the asset bundle, the new forked asset; and
automatically rebalance, based on adding the new forked asset to the asset bundle, the asset bundle.

13. The cryptocurrency platform system of claim 12, wherein the bundle management system is configured to determine whether the new forked asset is related to the asset bundle based on an identification that the new forked asset is related to at least one asset included in the asset bundle.

14. The cryptocurrency platform system of claim 13, wherein the new forked asset is added to the new asset bundle responsive to the determination that the new forked asset is related to the asset bundle.

15. The cryptocurrency platform system of claim 13, wherein determining whether the new forked asset is related to the asset bundle comprises: determining that metadata for the new forked asset is related to metadata of the asset bundle.

16. The cryptocurrency platform system of claim 13, further comprising a hosted wallet system that is communicatively coupled to the bundle management system, the cryptocurrency exchange system, and the user interface system.

17. The cryptocurrency platform system of claim 16, wherein the bundle management system is configured to:
generate a new bundle account for the user for the new forked asset;
determine an amount of the new forked asset to be transferred to the new bundle account; and
transfer the amount to the new bundle account.

18. The cryptocurrency platform system of claim 17, wherein generating the new bundle account for the user for the new forked asset comprises: the bundle management system controlling the hosted wallet system to generate a cryptocurrency wallet for the user for the new bundle account, wherein the cryptocurrency wallet manages the new bundle account.

19. The cryptocurrency platform system of claim 12, wherein the bundle management system is configured to:
automatically assign weights to one or more assets in the asset bundle based on market capitalization values of the one or more assets or based on the allocation strategy information; and
generate a weighted asset bundle comprising the one or more assets and the assigned weights.

20. The cryptocurrency platform system of claim 12, wherein automatically rebalancing the asset bundle comprises automatically rebalancing the asset bundle to match a market capitalization weighting ratio or a ratio set by the user.

* * * * *